United States Patent [19]
Shirato et al.

[11] Patent Number: 6,090,479
[45] Date of Patent: Jul. 18, 2000

[54] SHAPE-RECOVERABLE RESIN FOAMED PRODUCT

[75] Inventors: Hitoshi Shirato; Eiji Okada; Takashi Oguchi, all of Kyoto; Hiroshi Abe, Amagasaki; Masaru Koike, Tsukuba; Michitaka Tsujimoto, Takatsuki, all of Japan

[73] Assignee: Sekisui Kagaku Kogyo Kabushiki Kaisha, Osaka, Japan

[21] Appl. No.: 09/046,613

[22] Filed: Mar. 24, 1998

Related U.S. Application Data

[63] Continuation-in-part of application No. 08/665,690, Jun. 18, 1996, abandoned.

[30] Foreign Application Priority Data

| Jun. 26, 1995 | [JP] | Japan | ................................... 7-159098 |
| Nov. 17, 1995 | [JP] | Japan | ................................... 7-299654 |
| Jan. 19, 1996 | [JP] | Japan | ................................... 8-007244 |

[51] Int. Cl.$^7$ ..................................................... B32B 3/26
[52] U.S. Cl. .................................... 428/304.4; 428/308.4; 428/314.4; 428/318.6; 428/319.1; 428/319.3; 428/411.1; 428/423.1; 521/51; 521/142; 521/146; 521/149; 521/155

[58] Field of Search ..................................... 521/142, 149, 521/155, 51, 146; 428/411.1, 423.1, 304.4, 308.4, 314.4, 318.6, 319.1, 319.3

[56] References Cited

U.S. PATENT DOCUMENTS

| 4,101,467 | 7/1978 | Park et al. ................................. 521/79 |
| 5,049,591 | 9/1991 | Hayashi et al. .......................... 521/159 |
| 5,387,050 | 2/1995 | Hovis et al. . |
| 5,418,261 | 5/1995 | Helsemans et al. ..................... 521/174 |

FOREIGN PATENT DOCUMENTS

| 0323197 | 7/1989 | European Pat. Off. . |

*Primary Examiner*—John M. Cooney, Jr.
*Attorney, Agent, or Firm*—Kanesaka & Takeuchi

[57] ABSTRACT

A resin foamed product is formed of a resin, and closed cells dispersed in the resin. The resin with the closed cells therein has a shape-recoverable property at an ambient temperature, a closed cell rate higher than 30% and a compression permanent set lower than 10%. Thus, when contraction takes place in the resin with the closed cells, after a predetermined time has passed without providing an outer stimulation to the resin, a shape of the resin foamed product formed of the resin with the closed cells is automatically recovered at least in one direction without equally expanding in all directions.

11 Claims, 13 Drawing Sheets

SHAPE-RECOVERABLE RESIN FOAMED PRODUCT

CROSS-REFERENCE TO RELATED APPLICATION

This is a CIP application of Ser. No. 08/665,690 filed on Jun. 18, 1996 which is now abandoned.

BACKGROUND OF THE INVENTION AND RELATED ART STATEMENT

The present invention relates to a shape-recoverable resin foamed product.

Heretofore, as a sealing material for filling a space, there have been known resin foamed products comprising shape-memory polymers which are heated at a time of application. (Japanese Patent Publications (KOKOKU) No. Hei 4-17980, (KOKOKU) No. Hei 7-39506, (KOKAI) No. Hei 6-298988, and (KOKAI) No. Hei 6-239955)

However, the above resin foamed products require time and labor for heating at a time of application, and also there may be some portions which can not be heated.

Also, there has been proposed re-expandable foamed plastic chips obtained by contracting a resin foamed product comprising a styrene-acrylonitrile based resin as a base resin and a specific volatile organic solvent as a foaming agent. [Japanese Patent Publication (KOKAI) No. Sho 62-13441]

However, since the chips contain the styrene-acrylonitrile resin as the base resin, the chips are liable to cause buckling at the time of contraction. To prevent the buckling, a high foaming magnification rate is required so that a cell diameter becomes large, and a characteristic, such as a heat insulating property, is decreased due to convection in the cell. Also, at a time of the re-expansion, spaces are created among chips so that the chips can not sufficiently fill the space. Further, since the chips re-expand, although the chips have a shape corresponding property to a certain extent, there has been a defect such that a desired shape design is difficult.

Accordingly, one object of the invention is to provide a shape-recoverable resin foamed product, which can substantially prevent defects of the prior art; has an excellent heat insulating property, fill property, sealing property and applicability; and can be advantageously used in a wide area as a heat insulating material for pipes; heat insulating material for buildings; buffer material for packages; cushion material for sport and leisure; sealing material for windstorm, dustproof, soundproof and waterproof in connecting portions of a civil engineering, construction and vehicle; and wood grain material.

Another object of the invention is to provide a shape-recoverable resin foamed product as state above, wherein the shape covering time can be controlled as desired.

A further object of the invention is to provide a shape-recoverable resin foamed product preferably used as not only a sealing material and a wood grain material but also a cushion material for packages, covering material, buffer material and heat insulating material.

A still further object of the invention is to provide a shape-recoverable foamed product and a laminated structure preferably used as a sealing material and wood grain material having an excellent handling property, filling property or applicability.

Further objects and advantages of the invention will be apparent from the following description of the invention.

SUMMARY OF THE INVENTION

A resin foamed product according to present invention 1 comprises a shape-recoverable resin foamed product having a closed cell structure at a normal temperature and is shape-recoverable at least in one direction and in a non-similar shape as compared to the shape before the shape is recovered.

In the present invention, "shape-recoverable at the normal temperature" means that even if the resin foamed product is deformed into any desired shape, the resin foamed product memorizes an original shape, and after the contracted resin foamed product is applied to a space to be sealed, it gradually returns to the shape before deformation.

The resin foamed product having the closed cell structure to be used in the present invention is obtained by foaming a foamable resin composition comprising a resin and a foaming agent as main components.

A closed cell rate of the resin foamed product having the closed cell structure is preferably 5% or more, more preferably 30% or more, and most preferably 50% or more. If the closed cells in the resin foamed product are less than 30%, when the resin foamed product with the shape recovery property is opened or used at a working site, the recovery speed becomes too fast. Thus, the resin foamed product can not be properly disposed in a narrow space to be installed, which is not good in working ability. Since contraction of the resin foamed product is caused by contraction of the closed cells, when the closed cell rate is small, contraction or expansion of the resin foamed product scarcely takes place. Further, in case the resin foamed product is forcedly compressed, air directly enters open cells, so that expansion takes place too early, and the moment the compression is removed, the resin foamed product expands.

Also, compression permanent set or distortion of the foamed product is preferably less than 10%. If the compression permanent set exceeds more than 10%, in case the product is compressed, the recovery rate from the thin product becomes low or bad, so that the compressed foamed product can not recover the shape as intended.

As a resin, a synthetic resin is preferable, but if it has a foaming property, a natural resin may be used.

As a synthetic resin, a thermoplastic resin or a thermosetting resin may be used.

As a thermoplastic resin, for example, there are olefin based resins, such as polyethylene, polypropylene, ethylene-propylene copolymer, ethylene-propylene-diene copolymer, ethylene-vinylacetate copolymer, polybutene and chlorinated polyethylene; styrene based resins, such as polystyrene, styrene-butadiene-styrene copolymer and styrene-isoprene-styrene copolymer; acrylic based resins, such as polymethyl acrylate, polymethyl methacrylate and ethylene-ethylacrylate copolymer; chlorine based resins, such as polyvinyl chloride; fluoride resin, such as polyethylene fluoride; polyamide resins, such as 6-nylon, 66-nylon and 12-nylon; polyester resins, such as polyethylene terephthalate and polybutylene terephthalate; acrylonitrile-butadiene-styrene copolymer; polycarbonate; polyacetals; polyphenylene sulfide; polyether ether ketone; polyether imide; silicon resin; thermoplastic urethane resin; and various elastomers. These resins may be cross-linked.

Also, as a thermosetting resin, for example, there are urethane based resins, epoxy based resins, phenol based resins, urea resin, melamine based resin, silicon resin, imide based resins, and a hardened substance of unsaturated polyester.

As the natural resin, for example, there are cellulose, starch, protein, rubber and the like.

These resins may be used alone or as a mixture of two or more thereof.

When a flexural modulus of the above resins is large, cell breakage is liable to take place at a time of contraction to thereby reduce a shape recovering ability, while when the flexural modulus is small, a shape recovering quantity is reduced or a shape recovery is delayed. Therefore, the flexural modulus is preferably 30,000 kgf/cm² or less, more preferably 100–25,000 kgf/cm², and most preferably 100–20,000 kgf/cm².

As a resin having a flexural modulus of 30,000 kgf/cm² or less, for example, there are olefin based resins, such as polyethylene, polypropylene; ethylene-propylene copolymer, ethylene-propylene-diene copolymer, ethylene-vinylacetate copolymer, polybutene and chlorinated polyethylene; styrene based resins, such as polystyrene, styrene-butadiene-styrene copolymer and styrene-isoprene-styrene copolymer; chlorine containing resin, such as polyvinyl chloride; fluoride based resin, such as polyethylene fluoride; polyamide resins, such as 6-nylon, 66-nylon and 12-nylon; silicon resin; thermoplastic urethane; and various elastomers. These resins may be cross-linked.

As a foaming agent to be used in the present invention, there is no specific restriction on the foaming agent if it is normally used. For example, the following physical type foaming agents and thermal decomposition type foaming agents are mentioned.

As the physical type foaming agents, there are inorganic gases, such as carbonic acid gas, nitrogen gas, air, oxygen, neon and argon; aliphatic hydrocarbons, such as butane, pentane and hexane; aromatic hydrocarbons, such as benzene, toluene and xylene; ketones, such as acetone and methylethyl ketone; alcohols, such as methanol, ethanol and propanol; halogenated hydrocarbons, such as 1,1-dichloro-1-fluoroethane, 2,2-dichloro-1,1,1-trifluoroethane, 1,1,1,2-tetrafluoroethane, monochlorodifluoroethane and monochlorodifluoromethane; ethyl ether; and water. As the foaming agent, at least one or more selected from the above foaming agents is used.

As an inorganic gas, inorganic gases where a gas permeability coefficient "Pagent" of an inorganic gas with respect to a resin and a gas permeability coefficient "Pair" of air with respect to the resin have a relationship of "Pagent">"Pair", are preferable. In case the gas permeability coefficient "Pagent" of the inorganic gas and the gas permeability coefficient "Pair" of the air are in a relationship of "Pagent">"Pair", a closed cell foamed product which has been foamed is merely left under a normal temperature and pressure to thereby contract. As the foaming agents having the relationship of "Pagent">"Pair", for example, foaming agents shown in Table 1 are cited.

TABLE 1

GAS PERMEABILITY COEFFICIENT

Gas Permeability Coefficient [cm³ (STP) · cm · s/Pa]

| | LDPE | HDPE | PP |
|---|---|---|---|
| $H_2$ | $7.4 \times 10^{-13}$ | — | $31.0 \times 10^{-13}$ |
| He | $3.7 \times 10^{-13}$ | $0.86 \times 10^{-13}$ | — |
| Ar | — | $1.3 \times 10^{-13}$ | — |
| Xe | $4.0 \times 10^{-13}$ | — | — |
| $CO_2$ | $9.5 \times 10^{-13}$ | — | $6.9 \times 10^{-13}$ |
| AIR | $1.1 \times 10^{-13}$ | $0.16 \times 10^{-13}$ | $0.67 \times 10^{-13}$ |

STP: 273. 15K $1.013 \times 10^5$ Pa
LDPE: low density polyethylene

TABLE 1-continued

GAS PERMEABILITY COEFFICIENT

Gas Permeability Coefficient [cm³ (STP) · cm · s/Pa]

| LDPE | HDPE | PP |
|---|---|---|

HDPE: high density polyethylene
PP: polypropylene

Also, physical type foaming agents which are liquefied at a normal temperature are preferably used. For example, to foam polyethylene at a temperature of 100–110° C., pentane having a boiling point of 36.07° C., hexane having a boiling point of 68.74° C., benzene having a boiling point of 80.1° C., methanol having a boiling point of 64.51° C., ethanol having a boiling point of 78.32° C., ethyl ether having a boiling point of 34.48° C. and water having a boiling point of 100° C. are cited.

As thermal decomposition type foaming agents, which are usually used for manufacturing a resin foamed product of polyolefin, azodicarbonamide having a decomposition temperature of 200° C. N,N'-dinitrosopentamethylenetetramine having a decomposition temperature of 200° C., benzenesulfonylhydrazide having a decomposition temperature of 95° C., p-toluenesulfonylhydrazide having a decomposition temperature of 110° C. azobisisobutyronitrile having a decomposition temperature of 115° C. and N,N'-dimethyl-N,N'-dinitroterephthalamide having a decomposition temperature of 105° C. are cited.

To a resin composition, if necessary, a foaming assistant, filler, fire-retarding material, antioxidant or ultraviolet absorber may further be added.

As the foaming assistant for accelerating a foaming speed, metallic soaps, such as zinc stearate and calcium stearate; inorganic salts, such as hydrozincite and zinc nitrate; and acids, such as adipic acid and oxalic acid are exemplified. As the foaming assistant for decelerating the foaming speed, organic acids, such as maleic acid and phthalic acid; inorganic acid anhydrides, such as maleic anhydride and phthalic anhydride; and tin compounds, such as dibutyl tin maleate and tin chloride are exemplified.

As the filler, calcium carbonate, talc, clay, magnesium oxide, zinc oxide, carbon black, silicon dioxide, titanium oxide, glass fibers, glass powder and glass beads are mentioned.

As the fire-retarding material, for example, bromine based fire-retarding materials, such as hexabromobiphenylether and decabromobiphenylether; phosphoric acid based fire-retarding materials, such as ammonium polyphosphate, trimethyl phosphate and triethyl phosphate; melamine derivatives; and inorganic based fire-retarding agents are cited.

These materials may be used alone or as a mixture of one or more thereof.

A shape-recoverable resin foamed product of the present invention is defined such that a resin foamed product having a closed cell structure is recoverable at least in one direction and in a non-similar shape to that before the shape is recovered.

The contraction of the resin foamed product having the closed cell structure is carried out in an area including the elastic deformation. If the contraction completely enters the plastic deformation area or exceeds a fracture point, the shape recovery of the obtained resin foamed product does not take place.

"The shape-recoverable, at least, in one direction and in the non-similar shape relative to the shape before the shape is recovered" means that a contracted resin foamed product having a closed cell structure and a shape-recovering property does not include a case where the resin foamed product equally recovers in its shape in all directions in a similar figure, but includes a case where the resin foamed product is recoverable in its shape in a desired direction, and a contraction rate of the shape-recoverable resin foamed product varies depending on a direction.

More specifically, it includes the following cases: (1) a shape-recoverable resin foamed sheet obtained by contracting a resin foamed product having a closed cell structure is substantially recoverable only in a thickness direction thereof; (2) a shape-recoverable resin foamed rod or pipe obtained by contracting a resin foamed product having a closed cell structure is substantially recoverable only in a radius direction; and (3) only a portion of a resin foamed product obtained by contracting a resin foamed product having a closed cell structure is recoverable in its shape.

A quantity of shape-recovery varies based on using purposes. For example, in case a resin foamed product is used as a sealing material, when the quantity of shape-recovery is small, a sufficient sealing property can not be obtained, and when the quantity of shape-recovery is large, a heat insulating property is insufficient. Therefore, it is preferable that a foaming magnification rate after the shape is recovered is 5 to 80 times.

Although a compression permanent set (measured according to "JIS K 6767" (POLYETHYLENE FOAM TEST METHOD), after shape-recovery) of the shape-recoverable resin foamed product of the present invention is not specifically limited, it is preferably 20% or less, and further preferably 10% or less.

In the invention, a cross linking degree of the resin is higher than 40% in terms of a gel portion ratio. If the gel portion ratio is less than 40%, since the cross linking degree is low, in case the resin foamed product is kept for a long time in the compressed condition, flow of molecular chains is liable to happen. Thus, relaxation of the force applied to the foamed product in the compressed condition occurs, and the force in recovering the shape is lost, so that the recovery rate of the shape of the foamed product is lowered.

In regard to the foamed product with the gel portion ratio higher than 40%, the resin which was mentioned before may be cross-linked to make the gel portion ratio higher than 40%. The cross-linking may be carried out either before or after foaming, or may be carried out in two steps before and after the foaming.

As a cross-linking method, the following methods may be used:

1. For example, electron beam, gamma ray or ultraviolet is irradiated to a foamed product;
2. A peroxide is kneaded into a resin and the mixture is subjected to heating; or
3. A reactive functional group, for example vinylsilane, is copolymerized or grafted to a resin, and reactive functional groups thereof are reacted together.

In the invention, Tg of the resin constituting the foamed product is preferably lower than 0° C. If Tg is more than 0° C., in the temperature where the resin is generally used, flexibility or softness of the resin becomes insufficient. Accordingly, the foamed product becomes insufficient for filling the space with projections and dents. Thus, the sealing ability becomes bad.

As examples of the resins having Tg lower than 0° C., there are mentioned polyethylene, polypropylene, ethylene-propylene copolymer, ethylene-propylene-diene copolymer, ethylene-vinylacetate copolymer, polybutene, styrene-butadiene-styrene copolymer, styrene-isoprene-styrene copolymer, ethylene-ethylacrylate copolymer, polyvinyl fluoride, polyacetals, silicon resin, thermoplastic elastomer (urethane series, olefin series, styrene series), natural rubber and other elastomers.

Among the above-mentioned resins, the following resins are suitable according to uses:

In case a heat resisting property is required, there are mentioned resins having a softening point higher than 50° C., more preferably, 80° C., such as polyethylene, polypropylene, ethylene-propylene copolymer, ethylene-vinylacetate copolymer, styrene-butadiene-styrene copolymer, styrene-isoprene-styrene copolymer, polyvinyl fluoride, polyacetals, silicon resin, thermoplastic elastomer and other elastomers.

In case airtightness is required, there are mentioned resins having a Shore A hardness lower than 100, more preferably, 70, such as polyethylene, ethylene-propylene copolymer, ethylene-propylene-diene copolymer, ethylene-vinylacetate copolymer, polybutene, styrene-butadiene-styrene copolymer, styrene-isoprene-styrene copolymer, ethylene-ethylacrylate copolymer, polyvinyl fluoride, silicon resin, thermoplastic elastomer (urethane series, olefin series, styrene series), natural rubber and other elastomers.

In the invention, when contraction takes place in the resin with the closed cell, after a predetermined time has passed without providing an outer stimulation, i.e. heating or cooling, to the resin, a shape of the resin foamed product formed of the resin with the closed cells is automatically recovered at least in one direction without equally expanding in all the directions.

A method for producing the resin foamed product having a closed cell structure used in the present invention is not specifically limited, but the following method is preferably used.

(1) Extrusion Foaming

An extrusion foaming method comprises extruding, from a die, a foamable resin composition containing a resin and a foaming agent in a molten state so that the foamable resin composition is foamed through pressure change from a high pressure to a normal pressure. In this method, a gas used as a foaming agent is injected from the middle of an extruder provided with a die having a desired shape.

(2) Foaming in a Mold

A foaming-in-a-mold method comprises injecting, under pressure, a foaming agent into a molten resin in a pressurized container to dissolve the foaming agent in the molten resin; and then lowering the pressure in the container to the normal pressure to thereby foam.

(3) Normal Pressure Foaming

A normal pressure foaming method comprises beforehand melt-kneading a thermal decomposition type foaming agent at a temperature higher than a melting point of a resin and lower than a decomposition temperature of the foaming agent; shaping the molten resin into a desired shape; and then heating in a heating furnace to a temperature higher than the decomposition temperature of the foaming agent to thereby foam the resin under a normal pressure.

(4) Chemical Reaction Method

A chemical reaction method comprises foaming a resin by a gas generated through a reaction simultaneously with a formation reaction of a polymer.

A method for producing a resin foamed product according to present invention 2 comprises foaming a foamable resin composition containing a resin and a foaming agent having a relationship of "Pagent>Pair" wherein Pagent stands for a gas permeability coefficient of the foaming agent with respect to the resin, and Pair stands for a gas permeability coefficient of air with respect to the resin to obtain a resin foamed product having a closed cell structure; and leaving the obtained resin foamed product in a state wherein a portion thereof is fixed to thereby contract by taking advantage of a difference between the gas permeability coefficients of the foaming agent and air so that the resin foamed product according to invention 1 can be obtained.

In the present invention, as a resin contained in the foamable resin composition, the same resins as used in invention 1 can be used. As a foaming agent, the foaming agents having a relationship of Pagent>Pair explained in invention 1 can be used. In the equation, Pair stands for a gas permeability coefficient of air with respect to a resin and Pagent stands for a gas permeability coefficient of a foaming agent with respect to the resin.

A method for contracting the resin foamed product having the closed cell structure comprises fixing a portion of the resin foamed product having the closed cell structure with a tape or a needle only in a direction where its shape is not desired to recover, and leaving it under a normal temperature and pressure.

In case there are used the resin and the foaming agent having a relationship of "Pagent>Pair" wherein Pagent stands for a gas permeability coefficient of the foaming agent with respect to the resin and Pair stands for a gas permeability coefficient of air with respect to the resin, a gas quantity flowing out, i.e. permeating, into an external world, i.e. the atmosphere, from cells is greater than that flowing into the cells from the external world, i.e. the atmosphere, so that a relationship of "pressure in the cell<pressure in external world" is held. At this time, a force F1 compressed by the external world pressure and an elastic force F2 against therefor are applied to the resin foamed product so that the resin foamed product is deformed, i.e. contracted, to a state where the force F1 and force F2 are balanced. As the contraction progresses, a quantity of gas flowing out from cells to the external world, i.e. the atmosphere, is gradually decreased, and after a while, the quantity of gas flowing out from the cells to the external world and the quantity of gas flowing into the cells from the external world reach a balance level to thereby stop contraction and to be a shape-recoverable resin foamed product. Thereafter, the resin foamed product starts expanding and recovers its shape.

As the method for contracting the resin foamed product having the closed cell structure, the resin foamed product may be held for a predetermined time in a state where a desired distortion is provided to only in a direction where its shape is desired to recover by a method, such as compression, as described later.

A method for producing a resin foamed product of present invention 3 comprises foaming a foamable resin composition containing a resin and a foaming agent at a temperature higher than a boiling point of the foaming agent to thereby obtain a resin foamed product having a closed cell structure; and cooling the resin foamed product to a temperature lower than the boiling point of the foaming agent in a state where a portion of the resin foamed product is fixed, to thereby contract and obtain the resin foamed product of invention 1.

In the present invention, as the resin and foaming agent contained in the foamable resin composition, the same resins and foaming agents as those used in invention 1 can be used.

When the resin foamed product obtained by foaming at the above-mentioned temperature is cooled to the boiling point of the foaming agent, the foaming agent in the cells is also cooled to become liquid from gas. At this time, a pressure in the cells becomes smaller than that of the external world, i.e., atmospheric pressure, and the resin foamed product contracts to be a shape-recoverable resin foamed product. Thereafter, the obtained resin foamed product starts expanding due to air permeating into the closed cells which were contracted.

Incidentally, in case the boiling point of the foaming agent is lower than a normal temperature, a device for cooling a resin foamed product is required. However, when the boiling point of the foaming agent is higher than the normal temperature, any specific device for cooling the resin foamed product is not required.

As a specific method for partially compressing the resin foamed product with a distortion width including an elastic deformation area, for example, by using a producing apparatus as shown in FIG. 1, the first step A to the third producing step C are carried out.

The producing apparatus is formed of a heating zone 11, a compressing zone 12 and a cooling zone 13. The heating zone 11 and the compressing zone 12 are provided with heaters 14 and 15, and the cooling zone 13 is provided with a cooling blower 16, respectively.

In the first step A, a resin foamed product 10 is introduced between two endless belts 17, 17 provided in a heating zone 11 and transferred to an arrow direction. A space between the two endless belts 17, 17 is adjusted to be a thickness of the resin foamed product 10, and the belts are set at a temperature lower than a softening point of the resin and preferably, higher than a boiling point of the foaming agent.

In the second step B, the resin foamed product 10 is introduced between two endless belts 18, 18 provided in the compressing zone 12, and transferred to the arrow direction. The space between the endless belts 18, 18 is set to be gradually reduced, and a thickness of the resin foamed product 10 is gradually compressed.

In the third step C, the resin foamed product 10 is introduced between two endless belts 19, 19 provided in the cooling zone 13, and transferred to the arrow direction while being cooled by cooling blowers 16. The cooled resin foamed product 10 is wound into a roll outside the apparatus.

A cooling temperature in the third step C is set to a temperature lower than the boiling point of the foaming agent to thereby liquefy the foaming gas in the foaming cells.

The producing apparatus may be continuously disposed immediately after an extruder for forming the resin foamed product, or may be installed as a separate line. As a material to be used for the endless belts, generally, steel belts are cited. As a heating method, an infrared radiation panel heater, heating blower or the like is exemplified.

A method for producing a resin foamed product according to present invention 4 comprises partially compressing a resin foamed product having a closed cell structure with a distortion width including an elastic deformation area to thereby obtain the resin foamed product of invention 1.

In the present invention, as the resin foamed product having the closed cell structure, the same resin foamed product as used in invention 1 is used.

As a method for partially compressing the resin foamed product with the distortion width including the elastic deformation area, for example, the following methods are exemplified.

(1) Only a desired portion of the resin foamed product having the closed cell structure is compressed.

As a compressing method, any desired method, such as a press, roll, belt and drawing die, can be used.

(2) Only a desired portion in the contracted resin foamed product is kept in the compressed state, and the other portion is returned to the original shape by an elastic recovery and an air permeation through a cell membrane.

(3) A shape-recoverable resin foamed product to be recoverable to a non-similar shape relative to the shape before the shape is recovered and a normal resin foamed product are bonded together.

(4) When the resin foamed product is in a contracted state, a portion where the shape is not desired to recover is melt-bonded. As the melt-bonding method, any of known methods, such as a thermal melt-bonding and solvent melt-bonding, can be used.

As contraction means of the resin foamed product, as shown in FIG. 2, a pressing device may be used. The pressing device is formed of two opposed endless belts 101, 102 disposed with a predetermined space therebetween; and magnetics are provided to at least a pressing region on a side of one endless belt 101 to absorb magnetics or magnetic substance provided to a corresponding position on a side of the other endless belt 102 to thereby provide a desired pressing force between the two endless belts.

Also, as another contraction means for the resin foamed product, a device as shown in FIG. 3 may be used. In the device wherein a path extending from a main portion of a decompression chamber which is provided near an entrance to an exit is closed with a desired liquid, a foamable resin material is continuously supplied to the main portion of the decompression chamber to foam therein under a reduced pressure and obtain a resin foamed product 10'. Then, the resin foamed product 10' is passed through the liquid so that the resin foamed product is compressed by the liquid pressure and/or a desired compressing device from a desired direction, and then is continuously taken up at a desired speed from the exit.

In the present invention, a resin foamed product having the closed cell structure may be held in a state wherein it is compressed with a distortion width including an elastic deformation area. As the method, for example, there are a method (1) where a shape-recoverable resin foamed product having the closed cell structure is compressed with the distortion width including the elastic deformation area, and while keeping the state, the resin foamed product is continuously wound up; and a method (2) where a shape-recoverable resin foamed product having the closed cell structure is compressed with the distortion width including the elastic deformation area, and then, while keeping the compressed state by a tension of a belt-shape member, both the resin foamed product and the belt-shape member are continuously wound up.

Also, in the resin foamed product of invention 1, in order to obtain a resin foamed product having no residual odor of a volatile foaming agent used as a foaming agent, particles having a gas absorption property may be dispersed in a resin for constituting the resin foamed product to thereby absorb gas in cells.

A method for producing a resin foamed product according to present invention 5 comprises foaming a foamable resin composition containing a resin and a foaming agent under a reduced pressure state to obtain a resin foamed product having a closed cell structure; while holding the resin foamed product in the reduced pressure state, cooling the resin foamed product to a temperature lower than a softening point of the resin; and then exposing the resin foamed product to the atmospheric pressure to thereby obtain a shape-recoverable resin foamed product. In other words, the foamable resin composition is foamed under the reduced pressure state with a relationship B>A wherein A represents a foaming magnification rate when the foamable resin composition is foamed under a condition of 1 atm and B represents a foaming magnification rate under the reduced pressure state.

In the present invention, as a resin and a foaming agent contained in the foamable resin composition, the same resins and foaming agents as used in invention 1 can be used.

As the resin foamed product having the closed cell structure formed by foaming, the same resin foamed products as used in invention 1 are preferable.

In the present invention, as a foaming magnification rate A at a time of foaming the foamable resin composition under a condition of 1 atm and a foaming magnification rate B under a reduced pressure condition have a relationship of B>A, the foamable resin composition is required to foam under a reduced pressure condition, and preferably, B/A is in a range of 1.1–20.

When B/A is less than 1.1, after application of the obtained resin foamed product, an expansion property thereof is not good, and a good sealing property may not be obtained. On the contrary, in case B/A is greater than 20, when the obtained resin foamed product is exposed to the atmospheric pressure, a contraction rate thereof is large so that the resin foamed product itself is plastically deformed, an expansion property after application thereof is deteriorated, and a good sealing property may not be obtained.

When a resin foamed product is produced under a reduced pressure state, for example, a decompression chamber and a dry vacuum sizing die are used.

In case the decompression chamber is used, a pressure in the decompression chamber is preferably 35 to 690 mmHg. When the pressure is less than 35 mmHg, an expanding property after application of the resin foamed product is deteriorated, and cells of the resin foamed product may be broken. Also, in case the pressure is larger than 690 mmHg, the expanding property of the resin foamed product after application is deteriorated.

A method for producing the resin foamed product by using the decompression chamber is specifically explained hereinunder.

A foamable resin composition containing a resin and a foaming agent is placed in a vacuum dryer heated to a temperature suitable for foaming thereof to thereby foam. Thereafter, the obtained resin foamed product is cooled to a temperature lower than a softening point of the resin while maintaining the resin foamed product in a reduced pressure state, and then taken out to the atmospheric pressure ambience.

In case a continuous treatment is carried out, a foamable resin composition containing a resin and a foaming agent is placed in a decompression chamber having sealing devices at an entrance and an exit, respectively. In case an extrusion foaming, a decompression chamber may be provided immediately after an exit of a die.

A method for producing a resin foamed product of present invention 6 comprises expanding a resin foamed product having a closed cell structure at a temperature higher than a softening point of the resin; cooling to a temperature lower than the softening point of the resin while keeping the expanded volume; and then exposing the expanded resin foamed product to the atmospheric pressure to thereby provide a shape-recoverable property.

In the present invention, as a resin foamed product having a closed cell structure, the same resin foamed product as used in invention 1 can be used.

Expansion of the resin foamed product having the closed cell structure is carried out at a temperature higher than a softening point of the resin. At a temperature lower than the softening point of the resin, the resin foamed product does not expand.

Incidentally, "the softening point" means a Tg temperature when a non-crystalline resin is used, and "the softening point" means a Tm temperature when a crystalline resin is used.

"Expansion of the resin foamed product" means to hold a relationship of D>C wherein C represents a volume before expansion of the resin foamed product and D represents a volume after expansion of the resin foamed product.

An expansion rate D/C of the resin foamed product is preferably in a range of 1.1 to 20. When the expansion rate is lower than 1.1, the shape-recoverable resin foamed product has a lower expanding property after application thereof so that the sealing property and heat insulating property are not good. On the contrary, in case the expansion rate is higher than 20, when the resin foamed product is exposed to the atmospheric pressure, its contraction rate becomes large, the resin itself is plastically deformed, and expanding property of the resin foamed product after application is deteriorated, so that good sealing property and heat insulating property can not be obtained.

Although the expanding method is not specifically limited, for example, there is a method where the resin foamed product is exposed to a reduced pressure at a temperature higher than the softening point of the resin.

The reduced pressure is preferable in a range of 35 to 690 mmHg. In case the reduced pressure is lower than 35 mmHg, the shape-recoverable resin foamed product is deteriorated in an expanding property after application, and cells of the resin foamed product may be broken at the time of expansion. In this point, also, the expanding property after application of the shape-recoverable resin foamed product may be deteriorated, and in case the reduced pressure is larger than 690 mmHg, the expanding property of the shape-recoverable resin foamed product after application is not so good.

A method for producing a resin foamed product of present invention 7 comprises placing a resin foamed product having a closed cell structure in an ambience of which pressure is lower than the atmospheric pressure to make a pressure in a closed cell be reduced; and then exposing the resin foamed product to the atmospheric pressure ambience to thereby provide a shape-recovering property.

As the resin foamed product having the closed cell structure, the same resin foamed products as in invention 1 can be used.

The resin foamed product can be formed into any shape, such as a doll as well as a rod, string and sheet.

A reduced pressure is preferably in the order of 0.05 to 0.9 atm in terms of absolute pressure, and more preferably in the order of 0.05 to 0.5 atm.

More specifically, in case the pressure is lower than 0.05 atm, when the resin foamed product is exposed to the atmospheric pressure ambience, a contraction rate thereof becomes large, the greater part of deformation of the resin itself becomes plastic deformation, and the shape-recovering property may be deteriorated. Also, in case the pressure is higher than 0.9 atm, the resin foamed product may not be sufficiently contracted. Further, when the resin foamed product is exposed to the atmospheric pressure ambience, a load may be applied to a predetermined direction of the resin foamed product, or an end portion in a predetermined direction of the resin foamed product may be fixed in its position.

More specifically, although a contraction rate of the obtained shape-recoverable resin foamed product can be controlled by adjusting a pressure reducing degree and a time for exposing the resin foamed product to the reduced pressure ambience, since the contraction rate is changed by the resin foamed product, i.e., a kind of resin, foaming magnification rate, closed cell rate, diameter (size) of the closed cell, thickness of a membrane of the closed cell and shape of a resin foamed product, it is preferable to carry out pre-experiments.

A resin foamed product of present invention 8 comprises a shape-recoverable resin foamed product having a closed cell structure in which an air permeating path extending from a surface to a portion of an inner closed cell structure is disposed at a desired position, and which is contracted with a distortion width including an elastic deformation area to thereby recover the shape.

In the present invention, as the resin foamed product having the closed cell structure, the same resin foamed products as in invention 1 can be used.

In the present invention, a section of the air permeating path is not limited to a specific shape, and shapes, such as a circle, triangle, square, star-shape, line and wave can be exemplified.

A size of the air permeating path is not specifically limited, but a section is preferably less than 7 $mm^2$ (in case the section is circle, the diameter is in the order of 3 mm); and the maximum value (width) of the air permeating path is more preferably less than an average cell diameter of the closed cell. More specifically, when the section of the air permeating path is too large, the cell structure is broken, and the resin foamed product may not be returned to the original shape.

Although a distance between the air permeating paths adjacent to each other is not specifically limited, in case the section of the air permeating path is smaller than the cell diameter, it is preferable that the distance is more than two times the cell diameter, and in case the section of the air permeating path is larger than the cell diameter, the distance between the air permeating paths is preferably longer than the cell diameter.

A depth of the air permeating path is determined according to a recovering time, and is not specifically limited. However, it is preferable that the path reaches an inner cell deeper than three inner closed cells from a surface of the resin foamed product, and the path may be extended to the other side of the resin foamed product. However, in case the resin foamed product is applied to a place where gas permeating and water flowing are not required, it is preferable that the gas permeating path is not extended to the opposite side thereof.

Further, the air permeating path may be provided perpendicular to a surface of the resin foamed product, or may be provided with a predetermined angle with respect to the surface thereof. Also, the air permeating path may be provided in a spiral shape toward an interior of the resin foamed product.

Incidentally, the air permeating paths can be provided in directions as shown in FIG. 4 according to shapes of the shape-recoverable resin foamed products.

In this connection, as shown in FIG. 4(a), in case a resin foamed product is a long sheet, air permeating paths can be provided in one direction of a thickness direction of the resin foamed product; as shown in FIG. 4(b), in case a resin foamed product is a long board, air permeating paths can be provided at least one direction either in a thickness direction or a width direction; as shown in FIG. 4(c), in case a resin foamed product is a long column, air permeating paths can be provided radially; as shown in FIG. 4(d), in case a resin foamed product is a block, air permeating paths can be provided at least in one direction out of a thickness direction, a width direction, a rear and front direction; and as shown in FIG. 4(e), in case a resin foamed product is a sphere, air permeating paths can be provided radially.

A method for producing a resin foamed product of present invention 9 comprises a step where air permeating paths are provided to a resin foamed product having a closed cell structure so that the paths extend from a surface thereof to a portion of the inner closed cell structure; and a step where the resin foamed product is contracted with a distortion width including an elastic deformation area of a resin for forming the resin foamed product to thereby provide a shape-recovering property.

In the present invention, as the resin foamed product having the closed cell structure, the same resin foamed products as in invention 1 can be used.

In the present invention, the method for providing the air permeating paths to the resin foamed product having the closed cell structure is not specifically limited. However, in case the air permeating paths in a shape of a hole are provided, methods using a needle (frog), drill, electron beam, laser beam and the like are exemplified. Also, in case an air permeating path in a shape of a groove is provided, a cutter (cutlery) can be used.

In this connection, in case a needle in a shape of spiral for drawing out a cork is screwed into the resin foamed product, a spiral-shape air permeating path can be provided. Also, when a hole is provided in a straight line to a resin foamed product in a distorted state, a non-straight line air permeating path can be formed.

Incidentally, either the step for providing the air permeating paths or the step for contracting the resin foamed product may be carried out first, or both steps may be carried out at the same time. However, in case gas having a high gas permeating property is used as a foaming agent, if the gas is held in a compressed state and the air permeating path is not extended to the opposite side (especially in a case of thin product), it is preferable that the air permeating path is provided first.

More specifically, in case the gas having the high gas permeating property is used as the foaming agent, or in case a compressed state is held, since the gas has to be discharged from cells when contracted, when the air permeating paths are formed previously, a time required for the contraction can be shortened.

Also, in case the air permeating paths are not penetrated to the other side of the resin foamed product, when the resin foamed product is previously contracted, the resin foamed product becomes thin, and a needle or the like may be penetrated therethrough.

A laminated structure of present invention 10 is formed by laminating on, at least, one side of a shape-recoverable resin foamed sheet having a closed cell structure, a covering layer formed of a resin sheet material having a flexural rigidity of more than 1 g·cm.

As a method for laminating the resin foamed product and the resin sheet material, there are exemplified a method carried out immediately after the resin foamed product is produced; and a method carried out after the resin foamed product is contracted.

The former method is used when the resin foamed product and the resin sheet material are laminated by a thermal melt-bonding; and the latter method is often used when the resin foamed product and the resin sheet material are laminated by an adhesive. However, it is preferable that the lamination is carried out by the thermal melt-bonding.

Incidentally, it is preferable that the thermal melt-bonding is carried out at a temperature lower than a softening point of the resin foamed product in case the resin foamed product and the resin sheet material to be a covering layer are laminated together, and both interfaces or at least one interface thereof are melt-bonded in a heated state by a high frequency heating or the like. However, in a state where the resin foamed product is not contracted right after production, the thermal melt-bonding may be carried out at a temperature higher than a melting point.

Also, the above resin foamed product and the resin sheet material may be mixed with a filler, reinforcing fiber, colorant, ultraviolet absorber, antioxidant, fire-retarding material and the like.

As the filler, for example, calcium carbonate, talc, clay, magnesium oxide, zinc oxide, carbon black, silicon dioxide, titanium oxide, glass powder, glass beads and the like are cited.

As the reinforcing fiber, for example, glass fibers, carbon fibers and the like are mentioned.

As the colorant, for example, a titanium oxide and the like are exemplified.

As the antioxidant, provided that the antioxidant is generally used, there is no particular limitation. For example, tetrakis[methylene(3,5-di-t-butyl-4-hydroxyhydrocinnamate)]methane, dilauryl thiodipropionate, 1,1,3-tris(2-methyl-4-hydroxy-5-t-butylphenyl)butane and the like are cited.

As the fire-retarding material, a bromine based fire-retarding material, such as hexabromobenzene and decabromodiphenylether; a phosphoric acid based fire-retarding material, such as ammonium polyphosphate, trimethyl phosphate and triethyl phosphate; a melamine derivative; and an inorganic based fire-retarding material are exemplified. These fire-retarding materials are used alone or as a mixture of two or more thereof.

A laminated structure of present invention 11 is formed by laminating, on at least a portion of a surface of a shape-recoverable resin foamed product having a closed cell structure, a polymeric material membrane having a hardness in a range of 30 to 110 measured by a spring type hardness tester A at a temperature of 20° C.

As the polymeric materials for forming the membrane, provided that the materials have a hardness in the range of 30 to 110 measured by the spring type hardness tester A according to JIS K 6301 at a temperature of 20° C., they are not specifically limited. For example, a vinyl chloride based elastomer, olefin based elastomer, polyester based elastomer, polyamide based elastomer, natural rubber, butyl rubber, isoprene rubber and the like are exemplified.

A suitable range of a thickness of the high-molecular material membrane is determined according to a sealing property and gas permeating rate thereof. In view of the sealing property, in order to follow in an unevenness on a surface of a portion to be sealed, for example, it is desirable that a membrane is set to have a thickness from one half to 5 times a difference of the unevenness on the surface. Also, since a shape of the laminated structure is recovered by gas permeation, the membrane is set at an optimum thickness based on a time required for recovering its shape. Incidentally, since the gas permeating rate is also changed based on a kind of the polymeric material, it is preferable to examine an actual optimum thickness by manufacturing a laminated structure. However, it is generally preferable that the thickness of the polymeric material is in a range of 30 $\mu$m to 3 mm. More specifically, when the thickness is less than 30 μm, the following property in the uneven surface is deteriorated, and when the thickness exceeds 3 mm, the gas permeating property may be deteriorated to thereby take a long time until the shape is recovered.

A method for laminating the polymeric material membrane is not specifically limited. For example, as shown in FIG. 5, in case a rod-shape laminating structure 2 is formed, it is preferable that about half of a surface of a rod-shape foamed product 22 is covered by the polymeric material membrane 23.

The method for laminating the polymeric material membrane on a surface of a resin foamed product is not specifically limited. However, there are a laminating method which is carried out immediately after the resin foamed product is produced, and a laminating method which is carried out after the resin foamed product is contracted.

The former method is used in case a resin foamed product and the polymeric material sheet to be a membrane are laminated by thermal melt-bonding; and the latter method is used in case the laminated structure is formed through an adhesive. However, it is preferable that the lamination is carried out by the thermal melt-bonding.

Incidentally, the thermal melt-bonding, for example, is carried out such that the resin foamed product and the polymeric material sheet to be the polymeric membrane are laminated together, and while heating both or at least one of the interfaces thereof by a high frequency heating or the like, a pressure is applied thereto. Also, as a thermal melt-bonding temperature, in case the resin foamed product in a contracted state is subjected to the melt-bonding, it is preferable that only a surface of the resin foamed product becomes higher than the softening point. However, in case the resin foamed product immediately after production, which is in a non-contracted state, is subjected to the thermal melt-bonding, a temperature of the whole resin foamed product may be higher than the melting point.

A laminated structure of present invention 12 is formed by laminating an inorganic substance having air permeating holes on at least a portion of a surface of a shape-recoverable resin foamed product having a closed cell structure.

As the inorganic substance, if the inorganic substances have air permeating holes with a desired gas permeating rate, they are not specifically limited. For example, a metal mesh, metal foil provided with the air permeating holes, paper, woven cloth and the like are mentioned.

As a method for laminating the inorganic substance to the resin foamed product, there are a method where they are laminated together by an adhesive, and a method where, if the inorganic substance is a metallic substance, the inorganic substance is heated to a temperature higher than a melting point of the resin foamed product to thereby melt-bond to the resin foamed product.

Incidentally, in case the lamination is carried out by the melt-bonding, it is preferable that the melt-bonding is carried out in a state before the resin foamed product is contracted. More specifically, when the melt-bonding is carried out in a contracted state of the resin foamed product, it is difficult to raise a temperature of only the surface of the resin foamed product to a temperature higher than the softening point.

Since a density of the air permeating holes can be designed according to a recovering time required, it is preferable to confirm the density through a pre-test. In this connection, in case the density of the holes is 0.01–1 hole/cm², the recovering speed becomes 1 to 30 times when compared with a case where a material having no air permeating holes is laminated.

A laminated structure of present invention 13 is formed by laminating an adhesive agent layer having air permeating holes on at least a portion on a surface of a shape-recoverable resin foamed product having a closed cell structure.

The adhesive agent for forming the adhesive agent layer having air permeating holes is not specifically limited. For example, an acrylic based adhesive agent, urethane based adhesive agent, vinyl acetate based adhesive agent, natural rubber based adhesive agent and the like are mentioned.

Although a thickness of the adhesive agent layer is determined according to a surface coarse on a portion where the laminated structure is applied, generally, it is preferable that the thickness is in a range of 30 μm to 300 μm.

As a laminated structure of present invention 14, at least a single layer of a shape-recoverable resin foamed product having a closed cell structure is melted only at surfaces thereof, and the resin foamed product is melt-bonded with adjacent layers.

A method for producing the laminated structure of the invention comprises placing a melt-bonding material melted by heating previously between the resin foamed product and a material to be laminated thereon to thereby bond together.

The material to be laminated is not specifically limited. For example, a shape-recoverable resin foamed product, a non-shape-recoverable resin foamed product having a closed cell structure, a resin formed product and the like are exemplified.

As melt-bonding materials, if they are melt-bonded to a shape-recoverable resin foamed product or a material to be laminated in a melt-bonding state and are not peeled off after cooling, they are not specifically limited. There are exemplified olefin based resins, such as polyethylene, polypropylene, ethylene-propylene copolymer, ethylene-propylene-diene copolymer and ethylene-vinylacetate copolymer; acrylic based resins, such as polymethyl methacrylate, polymethylene methacrylate and ethylene-ethylacrylate copolymer; styrene based resins, such as butadiene-styrene copolymer, acrylonitrile-styrene copolymer, polystyrene, styrene-butadiene-styrene copolymer, styrene-isoprene-styrene copolymer and styrene-acrylic acid; vinyl chloride based resins, such as acrylonitrile-polyvinyl chloride copolymer and vinyl chloride-ethylene copolymer; vinyl fluoride based resins, such as polyvinyl fluoride and polyvinylidene fluoride; amide resins, such as 6-nylon, 6·6-nylon and 12-nylon; saturated ester based resins, such as polyethylene terephthalate and polybutylene terephthalate; polycarbonate; polyphenylene oxide; polyacetals; polyphenylene sulfides; silicon resins; thermoplastic urethane resins; polyether ether ketone; polyether imide; elastomers; and cross-linking products thereof.

Also, a melting temperature at the time of bonding the melt-bonding material is preferable to be higher than a melting point of the melt-boding material and lower than a temperature of 20° C.+a melting point of a resin for constituting the shape-recoverable resin foamed product.

More specifically, in case the melting temperature is lower than the melting point of the melt-bonding material, the melt-bonding material can not be melted. Also, in case the melting temperature is higher than the temperature of 20° C.+the melting point of the resin for constituting the shape-recoverable resin foamed product, at the time of bonding, the shape-recoverable resin foamed product may be damaged in its closed cells to thereby lose the shape recoverable property.

A method for melting the melt-bonding material is not specifically limited. For example, there are methods for heating and melting the melt-bonding material by a heater, oven, heat roller, heat press and the like.

Incidentally, it is preferable that the melt-bonding material is integrally applied beforehand to a desired portion of bonding surfaces/surface of the shape-recoverable resin foamed product and/or a material to be laminated. More specifically, in case the melt-bonding material is integrally applied beforehand, only the melt-bonding material is heated by a heater at an application site, so that the material to be laminated and the shape-recoverable resin foamed product can be laminated together to thereby improve applicability.

In this connection, as a method for integrally applying the melt-bonding material to the shape-recoverable resin foamed product beforehand, the following methods can be exemplified.

A. In case a shape-recoverable resin foamed product is produced by an extruder, a material melted by heating is extruded together with both sides or one side of the shape-recoverable resin foamed product.

B. In case a raw material of a thermal decomposition-type foamed product to be a material for a shape-recoverable resin foamed product is prepared by an extruder, a melting material is extruded together with one or both surfaces of the shape-recoverable resin foamed product through heating, and thereafter the shape-recoverable foamed product is obtained.

C. A resin sheet, net-shape resin sheet, resin chips or the like to be a melt-bonding material through heating is laminated on a surface of a shape-recoverable resin foamed product, and then the resin sheet, net-shape resin sheet, resin chips or the like is heat-melted by an oven, heater, heating roller, heating press or the like to thereby integrally be bonded on the surface of the resin foamed product.

Also, a heat generating material for generating heat responding to a high frequency is sandwiched between a shape-recoverable resin foamed product and a material to be laminated; the high frequency is applied to the heat generating material to generate heat and to melt at least a surface portion of the foamed product so that the shape-recoverable resin foamed product and the material to be laminated are melt-bonded together.

The heat generating material is not specifically limited. For example, (1) a material alone having a large dielectric loss coefficient, or a resin on which the material is scattered; and (2) a material having an electromagnetic induction property by itself, or a resin on which the material is scattered are mentioned.

A resin foamed product according to present invention 15 has a thermal contracting property wherein the resin foamed product contacts at least in a monoaxial direction, and a shape of the resin foamed product is recoverable in the other axial direction different from the thermal contraction direction.

As a method for providing the thermal contracting property to the resin foamed product, in the same manner as in the methods for producing the normal heat-contracting films, there are exemplified known drawing methods where, while heating, a raw material is subjected to drawing treatment by means of a tenter extruder or rollers, or by an inflation method.

The drawing direction may be a monoaxial direction or biaxial directions. Also, as the raw material, either a raw material foamed product or a shape-recoverable resin foamed product having a closed cell structure may be used.

However, in case the shape-recoverable resin foamed product having the closed cell structure is subjected to the drawing treatment, since heat is applied thereto at the time of drawing, a stress in a contracted state of the resin foamed product is softened by the heat, and the shape-recovering power may be weakened. Therefore, it is preferable that the raw material foamed product is subjected to the drawing treatment.

In the resin foamed product of the present invention, as a method for recovering the shape in the other axial direction, for example, as shown in FIG. 6, prior to start of the contraction, a resin foamed product 10″ is fixed, at least, at two portions of edges thereof.

Also, while drawing a resin foamed product containing a particle-shape filler at least in the monoaxial direction in an elastic deformation area of the resin, as shown in FIG. 7, a pressure is applied to the resin foamed product from a vertical direction with respect to the drawing direction to be a state as shown in FIG. 7(b) from a state as shown in FIG. 7(a), so that adjacent closed cells 104 and 104, and the closed cell 104 and a surface of the resin foamed product are connected through spaces 105, 105 created between the particle-shape filler 103 and the resin to thereby discharge gas in the cells. That is, a method where the resin foamed product is contracted in the vertical direction with a distortion width including the elastic deformation area of the resin is exemplified.

A resin foamed product of present invention 16 has an open cell structure therein wherein a skin layer is formed on a communicating surface between the open cells. Also, the resin foamed product is contracted with a distortion width including an elastic deformation area of the resin to thereby recover its shape.

As the open-cell resin foamed product, there is exemplified one where at least one side of a resin foamed product having a high closed cell rate is provided with the number of holes by needles to form the open cell structure therein so that at least one side of the resin foamed product may have the open cell communicating surface; or one wherein the whole inner portion of the resin foamed product has the open cell structure, and the entire surface may have the open cell communicating surface.

A shape of the resin foamed product is determined according to a place to be applied, and is not specifically limited. For example, a rod shape, tube shape, sheet shape, rectangular shape, wave shape, shape having a U-shape section, sphere, chip and the like are mentioned.

A method for producing the resin foamed product comprises compressing a resin foamed product having a general open cell structure, while heating or pouring a solvent on a surface thereof to thereby melt or dissolve the whole surface of the open cell structure portion; and then cooling or volatilizing the solvent to thereby solidify so that a skin layer is formed.

The skin layer is preferable to have a gas permeability having a relationship of $V/(S \times P)=1-1{,}000$ hr, wherein V cm$^3$ represents a volume of an open cell structure portion; S cm$^2$ represents a surface area of the open cell structure portion; and P cm$^3$/cm$^2$·hr·atm represents an air permeating quantity at the skin layer in a melt-bonding state.

In case a value of $V/(S \times P)$ is too small, an air quantity permeating into the open cell structure portion is too much, and the shape-recoverable resin foamed product of the present invention is expanded before it is applied as a heat insulating material. On the contrary, in case the value is too large, the air quantity permeating thereinto is too small to thereby take a time and lower the expansion rate.

The air permeating quantity P is measured according to JIS K 7126 "Gas Permeation Test Methods of Plastic Films and Sheets".

The contraction method is not specifically limited. For example, the following methods are mentioned.

(1) A method comprises compressing a resin foamed product wherein a skin layer is formed on an open cell communicating surface of an open cell structure portion by means of a compressing device, such as rollers, belts and pressing plates.

A material of the compressing device is not specifically limited, although the compressing device must deform the resin foamed product when it presses. In order to easily compress, it is preferable to use a porous material.

(2) A method comprises exposing a resin foamed product wherein a skin layer is formed on an open cell communicating surface of an open cell structure portion at a temperature higher than a softening point of a resin for constituting the resin foamed product and in a reduced pressure ambience lower than an atmospheric pressure; cooling the expanded resin foamed product to a temperature lower than the softening point of the resin for constituting the resin foamed product while holding a volume of the expanded resin foamed product; and after cooling, leaving the resin foamed product in an atmospheric ambience.

(3) A method comprises heating an open cell resin foamed product to a temperature higher than a softening point of a resin for constituting the resin foamed product in a reduced pressure ambience lower than an atmospheric pressure to thereby melt a surface thereof and form a skin layer on an open cell communicating surface; cooling the heated resin foamed product to a temperature lower than the softening point of the resin for constituting the resin foamed product while holding a volume of the heated resin foamed product; and then leaving the cooled resin foamed product in an atmospheric pressure ambience.

The time point for applying heat or a solvent may be prior to the compression, at the same time as the compression, or after the compression.

As heating methods, there are exemplified a direct heating method wherein the foamed product is directly heated, such as infrared radiation heating, fire heating, high frequency heating or hot wind heating; and a method wherein a compressing device, such as rollers, belts or pressing plates, is heated, and thermal conductivity thereof is used.

The heating temperature is higher than the softening point of the resin for constituting the resin foamed product. Incidentally, the softening point is the higher temperature of either Tg (glass transition point) or Tm (melting point).

As the solvents, if it has a capability for solving the resin for constituting the resin foamed product, it is not specifically limited. In this connection, in case the resin for constituting the resin foamed product is polyolefin, heat xylene, heat toluene, heat flow paraffin or like can be used as the solvent. In case the resin for constituting the resin foamed product is a styrene based resin, ethyl acetate, toluene or the like is mentioned. In case the resin for constituting the resin foamed product is polyvinyl chloride, tetrahydrofuran, methyl ethyl ketone or the like can be exemplified.

Incidentally, time and temperature necessary for melting or dissolving the whole surface of the open cell structure portion by applying heat or a solvent are not specifically limited. However, when time and temperature are applied too much, (1) even cells in the open cell structure portion are closed; and (2) resin in an inner portion in a thickness direction is dissolved or melted, so that expansion of the resin foamed product after application is deteriorated. Therefore, according to a kind of the resin foamed product, it is preferable that conditions, such as temperature and time, under which heat or a solvent is applied are previously determined through tests.

A laminated structure according to present invention 17 is a structure wherein the whole surface of an open cell communicating surface of an open cell resin foamed product or a fiber assembling structure in a compressed state is covered by a resin film to thereby recover its shape.

The fiber assembling structure represents a large number of fibers which is entangled with each other to thereby form a sheet or board. For example, a rock wool, glass wool, cellulose fiber or the like can be mentioned.

As the resin film for covering, it is preferable that the resin film has a gas permeating property with a relationship of:

$$V'/(S' \times P') = 1 - 1,000 \text{ hr}$$

wherein $V'$ $cm^3$ represents a volume of the resin foamed product or the fiber assembling structure; $S'$ $cm^2$ represents a surface area of the foamed product or the fiber assembling structure; and $P'$ $cm^3/cm^2 \cdot hr \cdot atm$ represents an air permeating quantity of the film. A kind of the resin for constituting the resin film and a thickness of the resin film are not specifically limited.

In case a value of $V'/(S' \times P')$ is too small, a quantity of air permeating into the laminated structure becomes too much. Therefore, the resin foamed product or the fiber assembling structure of the invention expands before it is applied as a heat insulating material. On the contrary, in case the value is too large, the quantity of air permeating into the laminated structure becomes too small to thereby take time for expansion.

With respect to the volume $V'$ of the resin foamed product or the fiber assembling structure, dimensions of a shape, such as rod, of the resin foamed product or the fiber assembling structure are measured, and a volume of a solid having the same shape as that of the resin foamed product or the fiber assembling structure is used as the volume of the resin foamed product or the fiber assembling structure.

The surface area $S'$ of the resin foamed product or the fiber assembling structure is calculated such that dimensions of a shape, such as rod, of the resin foamed product or the fiber assembling structure are measured, and a surface area of a solid having the same shape as that of the resin foamed product or the fiber assembling structure is used as the surface area of the resin foamed product or the fiber assembling structure.

The air permeating quantity P is measured according to JIS K 7126 "Gas Permeation Test Methods of Plastic Films and Sheets".

As a method for covering the whole surfaces of the open cell communicating surface of the open cell resin foamed product or the fiber assembling structure in a compressed state by a film, there are exemplified the following three methods.

(1) A resin film is laminated on a desired surface of a resin foamed product in a compressed state by heat or an adhesive agent.

For example, at least one side of the resin foamed product having a high closed cell rate is provided with a plurality of holes by needles or the like. Then, a resin film is laminated on the holed open cell communicating surface by heat or an adhesive agent under pressure by means of rollers, pressing plates or the like. In the thermal lamination method, the resin film and the open cell resin foamed product are laminated between the heated metal plates, rollers or steel belts, and pressed together to thereby thermally bond together. Also, as the adhesive agent lamination, a resin film coated with an adhesive agent thereon and an open cell resin foamed product are laminated together between pressing plates, rollers or steel belts, and then pressed to thereby bond together.

In a press method as shown in FIG. 8, a sandwich structure comprising a resin foamed product 33 provided with a plurality of holes by needles on upper and lower sides thereof and upper and lower films 34, 35 to hold the resin foamed product 33 therebetween is formed, and then pressed by an upper pressing plate 31 and a lower pressing plate 32 to thereby cover the upper and lower sides of the resin foamed product with the films 34 and 35.

In a rolling method as shown in FIG. 9, a resin foamed product 33 provided with a plurality of holes by needles on upper and lower surfaces thereof and films 38, 39 to sandwich from the upper and lower sides is passed between heated upper and lower rollers 36, 37 to be pressed therebetween so that the upper and lower surfaces of the resin foamed product 33 are covered with the films 38, 39.

(2) A whole open cell resin foamed product or fiber assembling structure is covered by films or put in a film bag, and then heat-sealed at an opening portion thereof under a compressed state by pressing plates, rollers, double belts or the like, or bonded by an adhesive.

For example, in a press method as shown in FIG. 10, a resin film bag 44 completely covering an open cell resin foamed product or a fiber assembling structure 43 is disposed between upper and lower pressing plates 41, 42, and then compressed by the upper and lower pressing plates 41, 42 to thereby cover the whole open cell resin foamed product or the whole fiber assembling structure 43 with the resin film 44. Also, an opening portion 441 of the resin film bag 44 is bonded by heat or bonded by an adhesive agent to thereby seal.

In this method, in case air inside the resin film bag 44 is extracted by a pump or the like, since the open cell resin foamed product or the fiber assembling structure 43 is prevented from being expanded by excessive air in the resin film bag 44, a better result can be obtained.

In a rolling method as shown in FIGS. 11(*a*) and 11(*b*), an open cell resin foamed product or fiber assembling structure 43 and resin films 48, 49 sandwiching the open cell resin foamed product or fiber assembling structure 43 from upper and lower sides are passed between an upper roller 46 and a lower roller 47 to thereby compress and cover the open cell resin foamed product or the fiber assembling structure 43 from both sides thereof with films 48, 49. Both side portions of the resin films 48, 49 are press-contacted by larger diameter portions 461, 471 at both ends of the upper and lower rollers 46, 47 to thereby be thermally sealed or sealed by an adhesive agent.

Incidentally, in inventions 1 to 17, the resin foamed product can be thermally contracted at any time before or after the shape thereof is recovered. Also, the resin foamed product without subjecting to the thermal contraction can be used. Further, it is preferable that the resin foamed products of the inventions are stored in a container made of a material having lower gas permeating property.

A resin foamed product according to invention 1 comprises a shape-recoverable resin foamed product having a closed cell structure at a normal temperature, which is contracted with a distortion width including an elastic deformation area, and is shape-recoverable at least in one direction and in non-similar shape to that before the shape is recovered. Therefore, when the resin foamed product is applied to a space to be sealed in a contracted state, since a contraction stress (inner power) and an atmospheric pressure (outer power) are applied to the contracted portion, the inner power and the outer power are balanced. However, the resin having a distortion attempts to return to a stable state at the time of foaming (elastic recovering property) and air enters the cells of the resin to thereby gradually expand. After application, when air enters the resin foamed product through a cell membrane, the inner pressure of the resin foamed product is increased so that the inner power becomes larger than the outer power, a volume of the contracted portion is expanded, and the inner power and the outer power are balanced so that the resin foamed product gradually returns to the shape before deformation in a desired direction to thereby fill and seal the space.

A method for producing a resin foamed product of invention 2 comprises preparing a resin foamed product having a closed cell structure by foaming a foamable resin composition containing a resin and a foaming agent having a relationship of Pagent>Pair, wherein Pagent represents a gas permeability coefficient of the foaming agent with respect to the resin, and Pair represents a gas permeability coefficient of air with respect to the resin; and leaving the resin foamed product in a state where a portion thereof is fixed to thereby contract by taking advantage of a difference between the gas permeability coefficients of the foaming agent and the air so that after foaming. In the other portions except for the fixed portion, since a gas quantity permeating into the outer world, i.e. the atmosphere, from the cell becomes larger than a gas quantity permeating into the cell from the atmosphere, a pressure in the cell becomes lower than the atmospheric pressure; the volume is contracted; the resin has distortions to thereby attempt to return to the stable condition at the time of foaming (elastic recovery); air enters into the cell; and the resin foamed product is gradually expanded. Thus, the resin foamed product of present invention 1 can be obtained.

A method for producing a resin foamed product of invention 3 comprises foaming a foamable resin composition containing a resin and a foaming agent at a temperature higher than a boiling point of the foaming agent to thereby obtain a resin foamed product having a closed cell structure; and cooling the obtained resin foamed product in a state where a portion thereof is fixed, to a temperature lower than the boiling point of the foaming agent to thereby contract the resin foamed product, so that since the foaming agent in a cell is also cooled to change the gas to a liquid, in other portions except the fixed portion, an inner pressure in the cell becomes lower than an outer world pressure, i.e. atmospheric pressure due to the volume contraction of the foaming agent; the volume thereof is contracted; the resin has a distortion to thereby attempt to return to a stable state at a time of foaming, i.e. elastic recovery and air enters the cell to thereby gradually expand. Thus, the resin foamed product of invention 1 can be obtained.

A method for producing a resin foamed product of invention 4 comprises partially compressing a resin foamed product having a closed cell structure with a distortion width including an elastic deformation area, so that in the compressed portion, gas in a cell is discharged through a cell membrane; an inner pressure in the cell becomes smaller than an outer world pressure, i.e. atmospheric pressure; a volume of the resin foamed product is contracted; the resin has distortion to thereby attempt to return to a stable state at a time of foaming, i.e. elastic recovery; and air enters the cell to thereby gradually expand the resin. Thus, the resin foamed product of invention 1 can be obtained.

Accordingly, the shape-recoverable resin foamed products obtained according to the methods of inventions 2 to 4 can be applied in a state that portions except a fixed portion thereof are contracted, so that the resin foamed products can be easily applied to a narrow space, and moreover a volume of the resin foamed product can be expanded due to the elastic recovery theory to thereby fill the space. Thus, the resin foamed products have an excellent sealing property.

A method for producing a resin foamed product of invention 5 comprises foaming a foamable resin composition containing a resin and a foaming agent under a reduced pressure state to thereby obtain a resin foamed product having a closed cell structure; cooling the obtained resin foamed product in the reduced pressure state to a temperature lower than a softening point of the resin; and then exposing the obtained resin foamed product to the atmospheric pressure to thereby obtain a shape-recoverable resin foamed product. The foamable resin composition is foamed under the reduced pressure so that a foaming magnification rate (A) when the foamable resin composition is foamed under a pressure of 1 atm and a foaming magnification rate (B) when the foamable resin composition is foamed under the reduced pressure have a relationship of B>A; and then the obtained resin foamed product is exposed to an atmospheric pressure, so that a volume thereof is contracted to the foaming magnification rate when the resin foamed product is foamed under the pressure of 1 atm, the resin has distortions and attempts to return to a stable state at the time of foaming, i.e. elastic recovery, and air enters a cell to thereby gradually expand. With the method of invention 5, the resin foamed product having the above properties can be obtained.

Therefore, since the shape-recoverable resin foamed product obtained according to the above method can be applied in a volume contracted state, the resin foamed product can be easily applied to a narrow space, and moreover, since the volume thereof is expanded at a normal temperature according to the elastic recoverable theory, the resin foamed product can fill spaces and has an excellent sealing property.

A method for producing a resin foamed product of invention 6 comprises expanding a resin foamed product having a closed cell structure at a temperature higher than a softening point of the resin; then cooling to a temperature lower than the softening point of the resin while keeping the expanded volume; and then exposing the obtained resin foamed product to the atmospheric pressure, so that the obtained resin foamed product has a shape-recoverable property, a volume thereof is contracted, the resin has distortions to thereby attempt to return to the stable state at the time of foaming, i.e. elastic recovery, and air enters a cell to thereby gradually expand. Thus, according to the method of invention 6, a resin foamed product having the above property can be obtained.

A method for producing a resin foamed product of invention 7 comprises placing a resin foamed product having a closed cell structure in a reduced pressure ambience lower than the atmospheric pressure to thereby make an interior of the closed cell in a reduced pressure state; and exposing the resin foamed product to an atmospheric pressure ambience to thereby provide a shape-recoverable property, so that the obtained resin foamed product is contracted in its volume, the resin has distortions to thereby attempt to return to the stable state at the time of foaming, i.e. elastic recovery, and air enters a cell to thereby gradually expand. Thus, according to the method of invention 7, the resin foamed product having the above properties can be obtained.

Therefore, since the shape-recoverable resin foamed products obtained according to inventions 6 and 7 can be applied in the volume contracted state, the resin foamed product can be easily applied to a narrow space, and moreover, a volume of the resin foamed product can be expanded at the normal temperature due to the elastic recovery theory to thereby fill the space. Thus, the resin foamed products have an excellent sealing property.

A resin foamed product of invention 8 comprises a shape-recoverable resin foamed product having a closed cell structure, wherein an air permeating path extending from a surface to an inner closed cell portion can be provided at a desired place and the resin foamed product is contracted with a distortion width including an elastic deformation area to thereby recover its shape, so that when an urging force in a compressed direction is removed, a thickness of the resin foamed product is gradually returned to an original thickness while balancing outer and inner pressures of cells due to an elastic recovering force of the resin. In this connection, since the closed cell disposed in the surface portion as well as the closed cell positioned in an inner portion can directly contact open air through the air permeating path, the shape recovering time of the resin foamed product can be shortened when compared with a case where no air permeating path is provided, and the shape recovering time can be controlled by adjusting a size, depth and number of the air permeating paths.

A method for producing a resin foamed product of invention 9 comprising a step wherein an air permeating path extending from a surface to an inner closed cell portion is provided to the resin foamed product having a closed cell structure; and a step where the resin foamed product is contracted with a distortion width including an elastic deformation area of a resin for constituting the resin foamed product to provide a shape recoverable property to the resin foamed product, thus to produce the resin foamed product according to invention 8 with good productivity.

A laminated structure of invention 10 is formed by laminating a covering layer made of a resin sheet material having a flexural rigidity higher than 1 g·cm on at least one side of a shape-recoverable resin foamed sheet having a closed cell structure; and compressing the laminated structure in only a thickness direction. Since the covering layer is laminated on the resin foamed sheet, the contraction and recovering direction thereof are limited to one direction, so that wrinkles created at the time of contraction can be prevented, and the resin foamed product after recovery has a smooth surface.

A laminated structure of invention 11 is formed by laminating, on at least a portion of a surface of a shape-recoverable resin foamed product having a closed cell structure, a polymeric material membrane having a hardness in a range of 30 to 110 measured by a spring type hardness tester A at a temperature of 20° C., so that a volume of the resin foamed product is kept in a contracted state by a natural contraction, an atmospheric pressure or a mechanical pressure; the contracted resin foamed product is smoothly inserted into even a narrow application space; the inserted resin foamed product is gradually recovered to its original shape by the elastic recovering force to thereby fill the desired application space. Moreover, a quantity of air permeating into cells through partition walls at the shape-recovering time can be adjusted by the polymeric material membrane to control the shape-recovering time, and the polymeric material membrane can be closely attached along a wall surface of the application site.

A laminated structure of invention 12 is formed by laminating an inorganic substance having gas permeating holes on at least a portion of a surface of a shape-recoverable resin foamed product having a closed cell structure, so that the resin foamed product in a contracted state can be smoothly inserted into a narrow application space and is gradually recovered to an original shape due to an elastic recovering power thereof. Therefore, the resin foamed product can be closely filled in a desired application place; moreover, a quantity of air entering cells through partition walls can be controlled by the inorganic substance layer having the gas permeating holes at a time of shape-recovery to thereby control the shape-recovering time; and the resin foamed product can be closely attached to a wall surface of the application place by the inorganic substance layer having the gas permeating holes.

A laminated structure of invention 13 is formed by laminating an adhesive agent layer having gas permeating holes on at least a portion of a surface of a shape-recoverable resin foamed product having a closed cell structure, so that the resin foamed product in a contracted state can be smoothly inserted into a narrow application space and is gradually recovered to an original shape due to an elastic recovering power thereof. Therefore, the resin foamed product can be closely filled in the desired application space; moreover, a quantity of air entering cells through partition walls can be controlled by the adhesive agent layer having the gas permeating holes at a time of shape-recovery to thereby control the shape-recovering time; and the resin foamed product can be closely attached to a wall surface of the application space by the adhesive agent layer having the gas permeating holes.

A laminated structure of invention 14 is formed such that at least a single layer of a shape-recoverable resin foamed product having a closed cell structure is melted only at a surface thereof so that the single layer is melt-bonded to an adjacent layer without using a specific mold or forming device to obtain the laminated structure. Since the resin foamed product is melted at only the surface thereof, the shape-recovering property thereof can not be deteriorated.

A resin foamed product of invention 15 has a thermal contracting property wherein the resin foamed product is contacted at least in a monoaxial direction by heating, and a shape of the resin foamed product can be recovered in the other axial direction different from the thermal contraction direction. Therefore, the resin foamed product of the invention can be used as a packing material and covering material in the same manner as the thermal contraction film as well as a buffer material and heat insulating material. Moreover, since a bulk of the resin foamed product of the invention which is not used is kept small, a transportation cost and storage cost thereof can be reduced.

A resin foamed product of invention 16 has an open cell structure portion therein wherein a skin layer is formed on an open-cell communicating surface. Also, the resin foamed product is contracted with a distortion width including an elastic deformation area of the resin to recover its shape, so that gas in the open cell structure portion is discharged to an outside through the skin layer to thereby contract. When the resin foamed product in the contracted state is applied to a space to be sealed, a compression stress (inner force) created by compression and an atmospheric pressure (outer force) are applied to the resin foamed product so that the inner force and the outer force are in a balanced state, the resin has distortions to attempt to return to a stable state at a time of foaming (elastic recovery property), and air enters the open cell structure portion through the skin layer to thereby gradually expand. After application, since a thickness of the resin foamed product is gradually returned to an original state at a normal temperature, the resin foamed product can be easily inserted into a narrow space, and when the thickness is recovered to the original state, the resin foamed product can be closely filled in the space and is not removed. Since the skin layer is formed on the open cell communicating surface of the open cell structure portion, the resin foamed product has an excellent sealing property, heat insulating property and soundproof property.

A laminated structure of invention 17 is a laminated structure wherein a whole surface of an open cell communicating surface of an open cell resin foamed product or a fiber assembling structure in a compressed state is covered by a resin film to recover its shape. Therefore, gas in the open cell resin foamed product or the fiber assembling structure is discharged to the outside through the resin film to contract. When the laminated structure is applied to a space to be sealed in the contracted state, a compression stress (inner force) created by the compression and an atmospheric pressure (outer force) applied to the laminated structure are in a balanced state; the resin foamed product or the fiber assembling structure has distortions to attempt to return to a stable state at the time of foaming (elastic recovery property); and when the compression state is released, air enters the open cell structure of the resin foamed product or the fiber assembling structure through the resin film to gradually expand. After application, since a pressure in the resin foamed product or the fiber assembling structure is increased so that the inner force becomes larger than the outer force and a volume of the laminated structure is expanded, the laminated structure of the invention in a compressed state can be easily inserted into a narrow space, and when the thickness of the laminated structure is returned to an original state, the laminated structure is closely filled in the narrow space and is not separated therefrom. Since the resin foamed product or the fiber assembling structure is closed with the resin film, the laminated structure has an excellent sealing property, heat insulating property and soundproof property.

BRIEF DESCRIPTION OF THE DRAWINGS

FIGS. 4(a)–4(e) are diagrams for showing directions in which air permeating paths are provided according to shapes of the resin foamed products, wherein FIG. 4(a) is a perspective view for explaining a case where the resin foamed product has a sheet shape;

FIG. 4(b) is a perspective view for explaining a case where the resin foamed product has a board shape;

FIG. 4(c) is a perspective view for explaining a case where the resin foamed product has a long column shape;

FIG. 4(d) is a perspective view for explaining a case where the resin foamed product has a block shape;

FIG. 4(e) is a perspective view for explaining a case where the resin foamed product has a sphere;

FIGS. 7(a) and 7 (b) are diagrams of another example for compressing the resin foamed product with the distortion width including the elastic deformation area, wherein, FIG. 7(a) is a section view for showing a state before compression;

FIGS. 20(a) and 20 (b) are sectional views for explaining examples of uses of the resin foamed products or the laminated structures of the present invention;

DETAILED DESCRIPTION OF THE PREFERRED EMBODIMENTS

Figure 1:
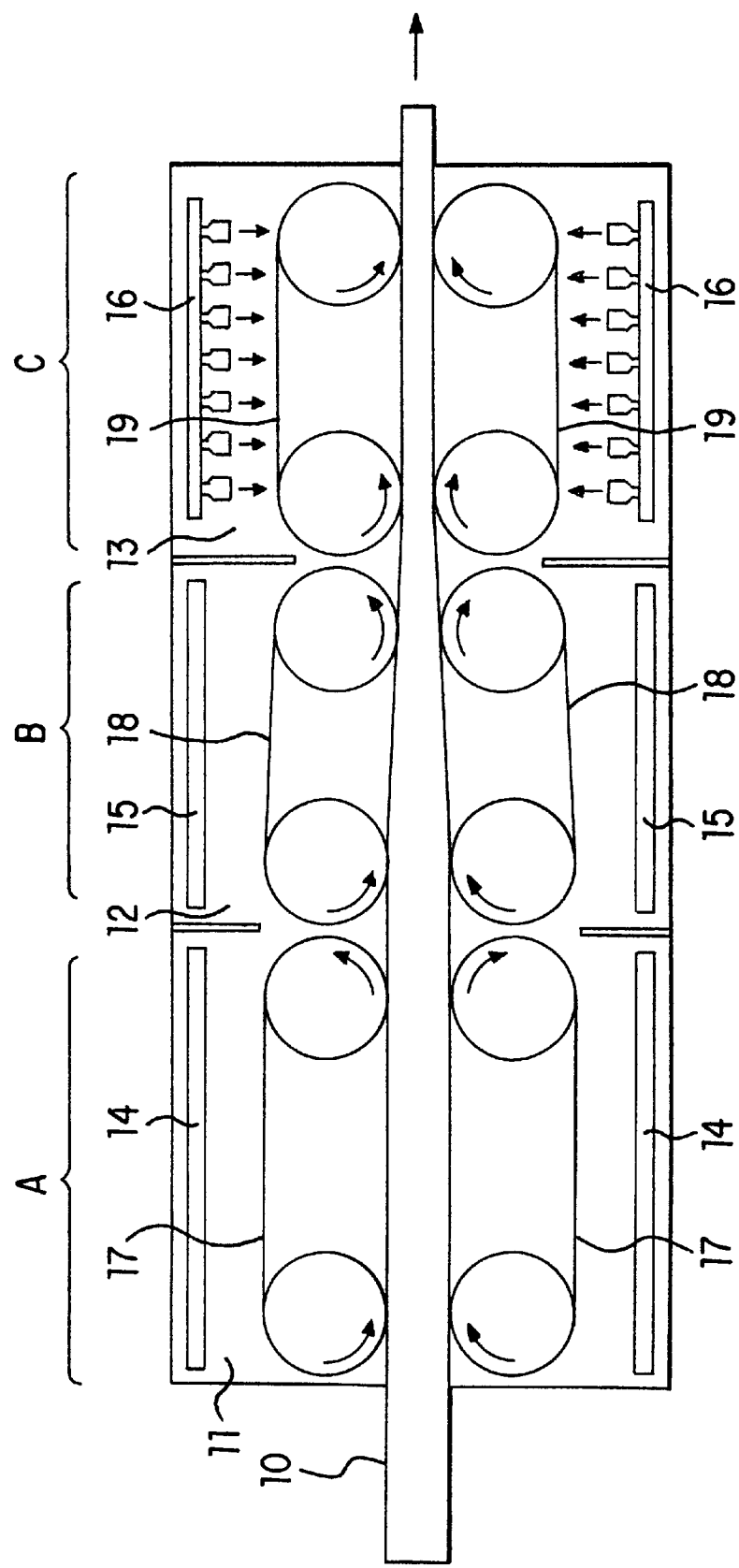
FIG. 1 is a diagram for explaining steps for compressing with a distortion width including an elastic deformation area in a method for producing a resin foamed product according to the present invention.
Figure 2:
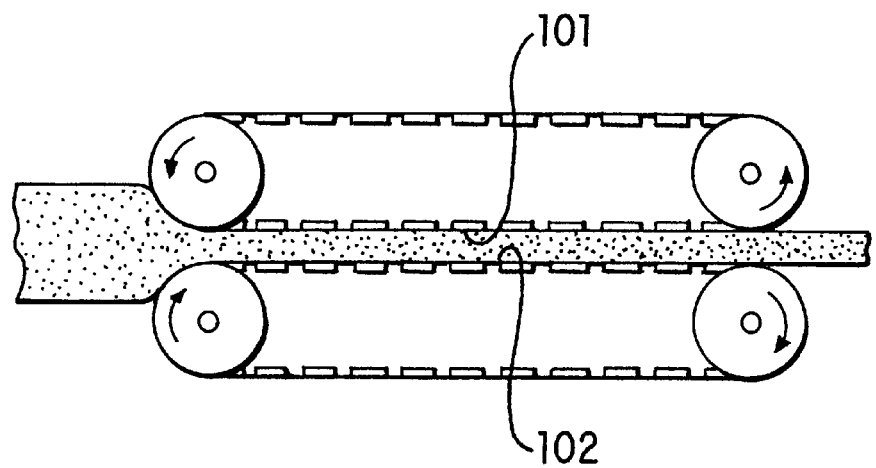
FIG. 2 is a front view for explaining another example for compressing the resin foamed product with the distortion width including the elastic deformation area in the present invention.
Figure 3:
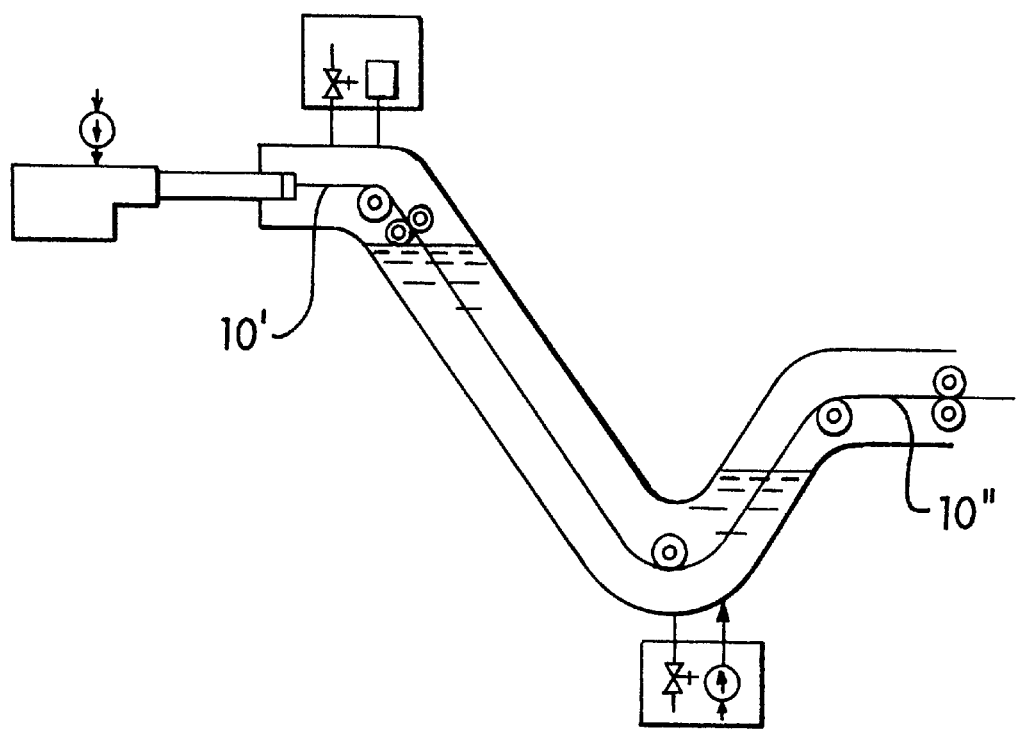
FIG. 3 is a front view for explaining a further example for compressing the resin foamed product with the distortion width including the elastic deformation area in the present invention.
Figure 4A:
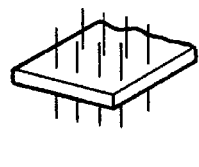
Figure 4B:
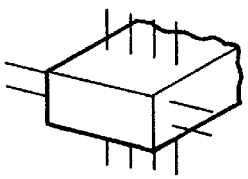
Figure 4C:
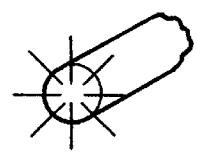
Figure 4D:
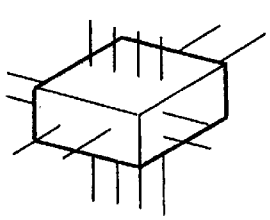
Figure 4E:
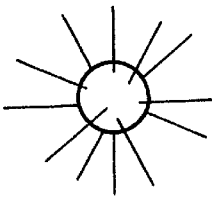
Figure 5:
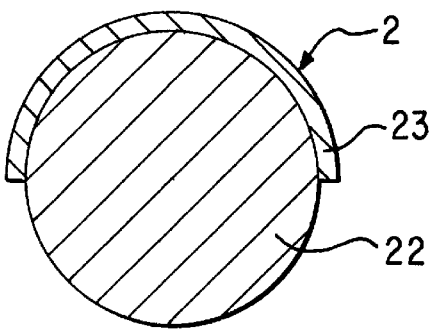
FIG. 5 is a section view for showing an example of a laminated structure of the present invention.
Figure 6:
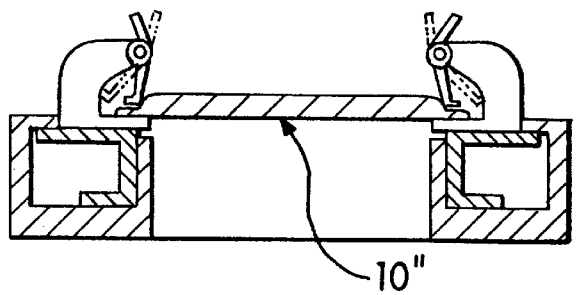
FIG. 6 is a section view for explaining a method for recovering a shape in the other axial direction in the resin foamed product of the present invention.
Figure 7A:
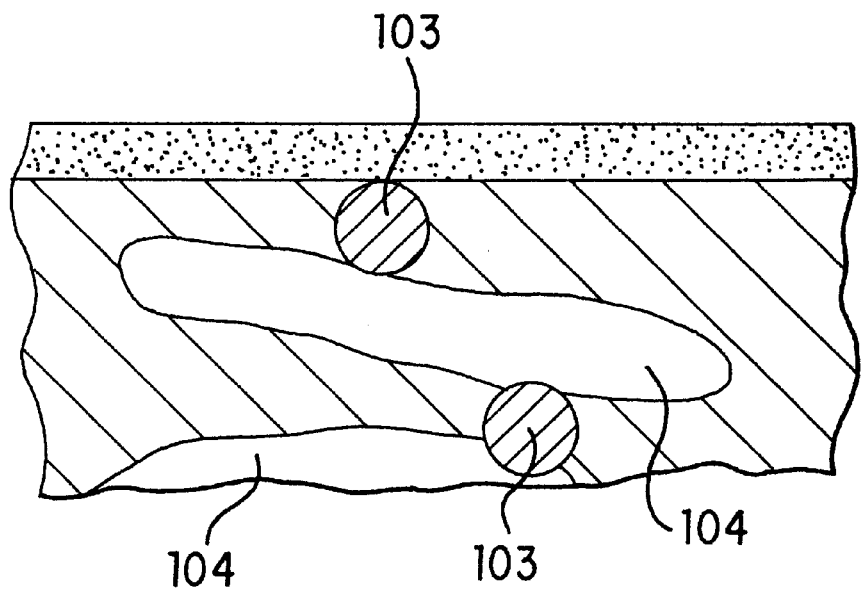
Figure 7B:
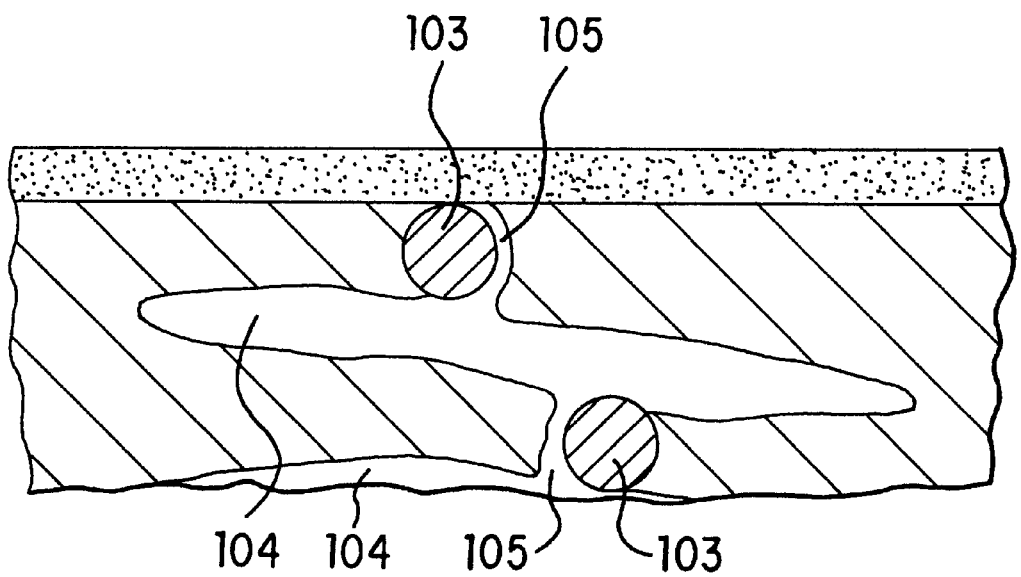
FIG. 7(b) is a section view for showing a state after compression.
Figure 8:
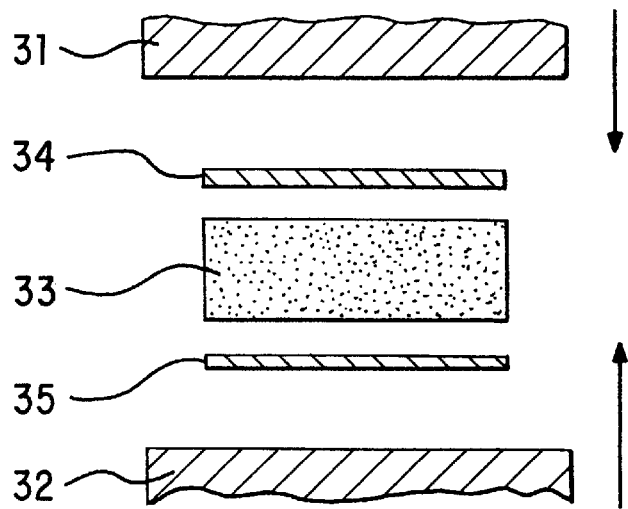
FIG. 8 is a section view for explaining a state where upper and lower surfaces of the resin foamed product are covered with resin films by a press method.
Figure 9:
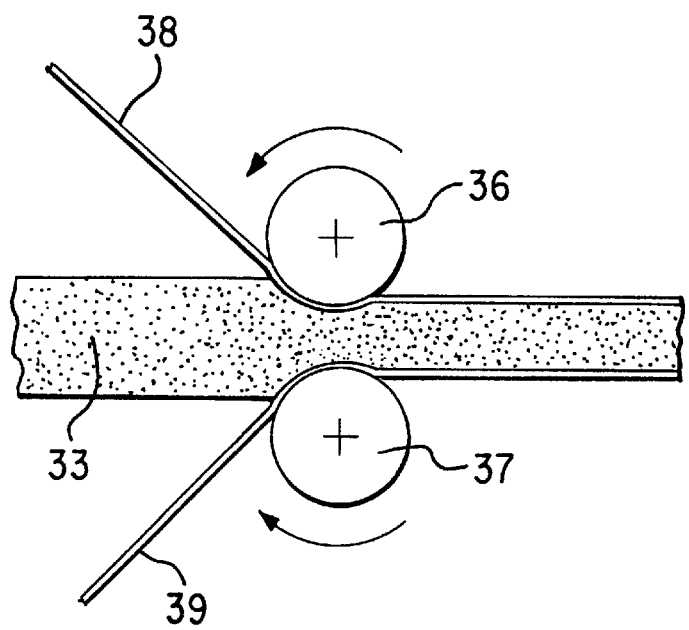
FIG. 9 is a section view for explaining a state where upper and lower surfaces of the resin foamed product are covered with resin films by a roll method.
Figure 10:
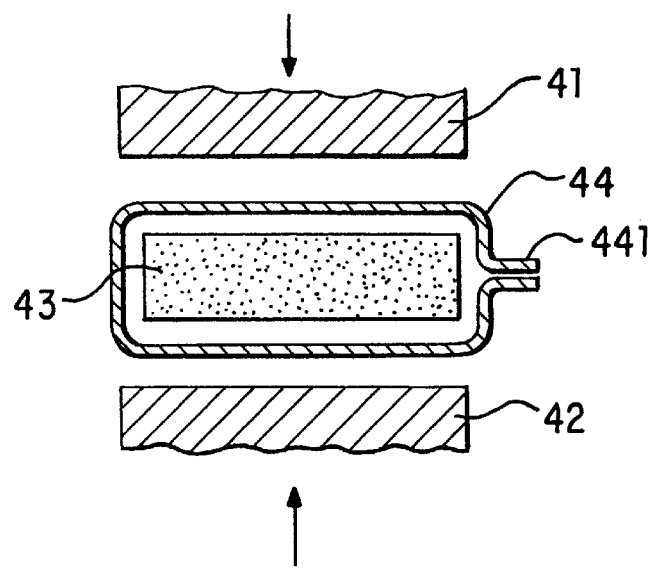
FIG. 10 is a section view for explaining a state where a circumference of the resin foamed product is covered with a resin film by a press method.
Figures 11A, 11B:
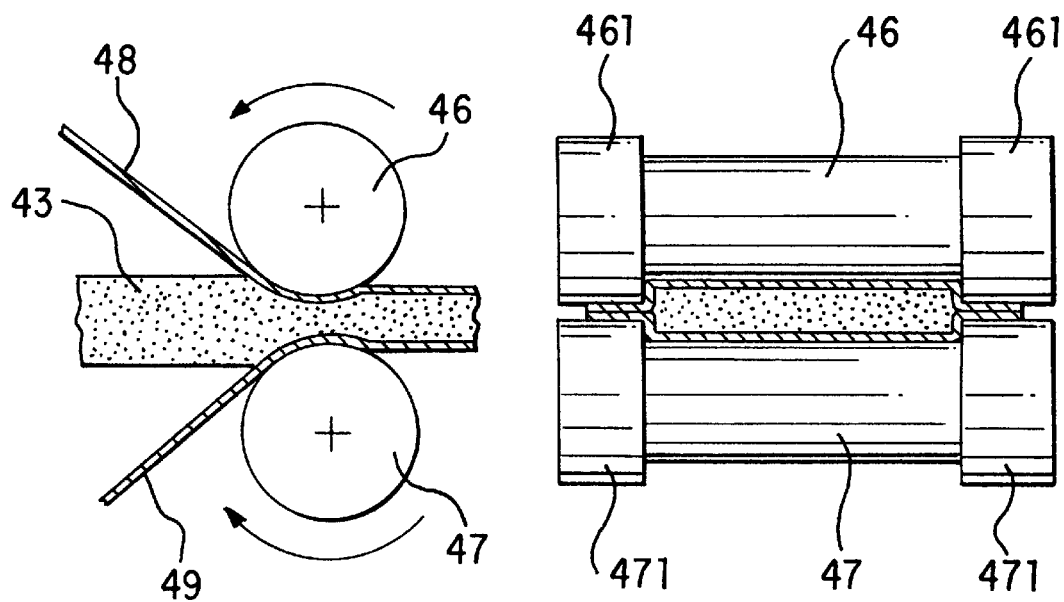
FIG. 11(a) is a section view for explaining a state where a circumference of the resin foamed product or a resin assembling structure is covered with a resin film by a roll method.
FIG. 11(b) is a front view thereof.

Hereinunder, modes of practice of the present invention are further described in detail by Examples. Incidentally, a foaming magnification rate, closed cell rate, open cell rate and contraction rate were measured by the following methods. Foaming Magnification Rate:

An obtained resin foamed product was cut into a small piece of 35 mm in length and 35 mm in width, and the small piece was sunk in water contained in a graduated cylinder to measure its volume A. Also, a weight of the small piece was measured by an electron balance.

The weight of the small piece of the obtained resin foamed product was divided by the volume A to obtain a density of the resin foamed product.

The foaming magnification rate was calculated by the following formula.

Foaming magnification rate=density of used resin/denslty of resin foamed product (times)

Closed Cell Rate and Open Cell Rate:

A volume B (closed cell volume+resin volume) was measured by 1-1/2-1 air pressure method by using an air comparison type densimeter 1000 (manufactured by Tokyo Science Co., Ltd.).

The closed cell rate was calculated by the following formula.

Closed Cell Rate (%)=100×[(volume B−weight÷density of resin)/ (volume A−weight÷density of resin)]

Open Cell Rate (%)=100−closed cell rate (%)

Contraction Rate (%)=100×(volume after contraction/volume right after foaming)

Recovery Rate (%)=100×[volume after recovery (expansion)/volume right after foaming]

EXAMPLE 1

(Examples 1–17 and Comparison Examples 1–4 correspond to 1–4 of the present invention)

A resin composition comprising a mixture of 100 parts by weight of a low density polyethylene (manufactured by Mitsubishi Chemical Co., Ltd., trade name "MITSUBISHI PORIECHI-LD LF440HB", a flexural modulus of 2,000 kg/cm$^2$) and 0.1 part by weight of talc (manufactured by Nippon Talc Co., Ltd., trade name "MS") as a cell core forming agent was melted and kneaded by a roller at 150° C., and thereafter was pressed for 5 minutes under a pressure of 150 kg/cm$^2$ at a temperature of 150° C. to obtain a sheet of a thickness of 10 mm.

The sheet was cut into a small piece of 100 mm in length and 100 mm in width. The small piece was charged into a shaping die (autoclave), heated to 110° C. to melt, and then charged with carbonic acid gas under a pressure of 100 kg/cm² to hold for one hour. Then, the pressure in the autoclave was reduced to a normal pressure to foam in a shape of sheet and thereby obtain a resin foamed product.

The obtained resin foamed product was a plate shape product of 310 mm in length, 310 mm in width and 31 mm in thickness, and had a foaming magnification rate of 29.2 times, and a closed cell rate of 89%.

Thereafter, the obtained resin foamed product was held between pressing plates to press to be a thickness of 15 mm, and then held for two days in its state. Two days later, the pressing plates were removed to obtain a resin foamed product of a thickness of 15 mm.

The obtained resin foamed product was cut into a sheet of 300 mm in length and 300 mm in width.

The cut piece of the obtained resin foamed product had 300 mm in length, 300 mm in width, 15 mm in thickness, a foaming magnification rate of 14.5 times, and a contraction rate of 50%.

Incidentally, the resin foamed product after 30 days under normal temperature and pressure had a shape of 300 mm in length, 300 mm in width, 30 mm in thickness, a foaming magnification rate of 28.5 times, and a recovery rate of 97%. A compression permanent set of the resin foamed product after shape recovery was measured according to JIS K 6767 to obtain 5.2%.

EXAMPLE 2

A resin composition comprising a mixture of 100 parts by weight of a low density polyethylene (manufactured by Sumitomo Chemical Co., Ltd., trade name "SUMIKASEN G201", a flexural modulus of 1650 kg/cm²), 0.6 part by weight of dicumyl peroxide (one minute half-life period temperature of 171° C.), and 15 parts by weight of azodicarbonamide (decomposition temperature of 198° C.) was supplied to a hopper of a screw extruder (diameter of 50 mm, L/D=30), and was melted and kneaded in the extruder. A temperature in a cylinder of the extruder was set at 105° C., 115° C., 120° C. and 120° C. in this order from the hopper to a forward end of the extruder.

The molten and kneaded substance of the resin composition was continuously extruded at a rate of 10 kg/hr in a sheet shape through a die of a shaping mold having 5 mm in thickness and 200 mm in width.

A hot air heating furnace was provided immediately after the shaping die. The extrusion formed sheet was heated at the first half portion of the hot air heating furnace at a temperature of 170° C. to cross-link, and then heated at the latter half portion of the hot air heating furnace at a temperature of 250° C. to foam.

The obtained resin foamed product was a sheet of 16 mm in thickness and 610 mm in width, and had a foaming magnification rate of 29.5 times and a closed cell rate of 86%.

The obtained resin foamed product was held between pressing plates, pressed to be 8 mm in thickness, and held in its state for two days. Two days later, the pressing plates were removed to obtain a sheet of a resin foamed product in a thickness of 8 mm.

The obtained resin foamed product had a length of 300 mm, a width of 300 mm, a thickness of 8 mm, a foaming magnification rate of 14.3 times and a contraction rate of 49%.

Incidentally, the resin foamed product under the normal temperature and pressure after 30 days had a length of 300 mm, a width of 300 mm, a thickness of 15 mm, a foaming magnification rate of 28.0 times and a recovery rate of 94%.

EXAMPLE 3

A resin foamed product was prepared in the same manner as in Example 1 except that a sheet of 5 mm in thickness was prepared by a press and compressed to be a thickness of 8 mm, to thereby obtain a resin foamed product having 8 mm in thickness.

The obtained resin foamed product was cut into a piece of 15 mm in width.

The cut piece of the obtained resin foamed product had a width of 15 mm, a length of 310 mm, a thickness of 8 mm, a foaming magnification rate of 14.5 times, and a contraction rate of 50%. Incidentally, the resin foamed product under the normal temperature and pressure after 30 days had a width of 15 mm, a length of 310 mm, a thickness of 15 mm, a foaming magnification rate of 28.5 times and a recovery rate of 97%.

EXAMPLE 4

The same resin composition as that in Example 1 was supplied to a hopper of a vent type screw extruder (diameter 65 mm, L/D=35), and was melted and kneaded in the extruder. A temperature of a cylinder of the extruder was set at 135° C., 160° C., 140° C. and 130° C. in this order from the hopper toward a forward end of the extruder.

Then, a carbonic acid gas was charged into the extruder through a vent portion thereof under a pressure of 90 kg/cm² to be fully melted into and kneaded with the resin composition, and then the kneaded substance was continuously extruded to foam in a rod shape at an extrusion rate of 10 kg/hr through an extruding die having a diameter of 1.5 mm and set at a temperature of 110° C.

The obtained resin foamed product was a rod having a diameter of 12 mm, and had a foaming magnification rate of 26.7 times and a closed cell rate of 87%.

Immediately after foaming, the rod shape product was contracted while being wound around a roller having a diameter of 300 mm to obtain a rod-shape resin foamed product having a diameter of 7 mm.

The obtained resin foamed product was a rod having a diameter of 7 mm and a length of 300 mm, and had a foaming magnification rate of 9.1 times and a contraction rate of 34%.

Incidentally, the resin foamed product under a normal temperature and pressure after 30 days had a diameter of 11.5 mm, a length of 300 mm, a foaming magnification rate of 25.1 times and a recovery rate of 92%.

EXAMPLE 5

A resin foamed product was prepared and pressed in the same manner as in Example 2 to obtain a resin foamed product having a thickness of 8 mm.

The resin foamed product was cut into a piece having a width of 15 mm.

The cut piece of the obtained resin foamed product had a width of 15 mm, a length of 310 mm, a thickness of 8 mm, a foaming magnification rate of 14.3 times and a contraction rate of 49%.

Incidentally, the resin foamed product under normal temperature and pressure after 30 days had a width of 15 mm, a length of 310 mm, a thickness of 15 mm, a foaming magnification rate of 28.0 times and a recovery rate of 94%.

EXAMPLE 6

The resin composition described in Example 1 was supplied to a hopper of a vent-type screw extruder (a diameter of 65 mm, L/D=35), and melted and kneaded in the extruder. A temperature of a cylinder of the extruder was set to 135° C., 160° C., 140° C. and 130° C. in this order from the hopper toward a forward end of the extruder.

Then, pentane was injected therein through a vent portion of the extruder at a rate of 10 parts by weight against 100 parts by weight of the resin, and fully melted into and kneaded with the resin composition in the extruder. Subsequently, the kneaded substance was continuously extruded through a die of the extruder set at a temperature of 110° C. and having a thickness of 3 mm and a width of 100 mm at an extruding rate of 10 kg/hr to foam in a sheet shape.

The obtained resin foamed product was a sheet having a width of 310 mm, a thickness of 15.5 mm, a foaming magnification rate of 29.8 times and a closed cell rate of 92%.

The resin foamed product was cut into a piece of 300 mm in length and 300 mm in width. Thereafter, the cut piece was fixed in upper and lower surfaces by pressing plates, and placed in a normal temperature tank at 23° C. The cut piece of the resin foamed product was contracted to obtain a sheet-shape resin foamed product having 300 mm in length, 300 mm in width and 5.5 mm in thickness (contraction rate 35%).

Incidentally, the resin foamed product under normal temperature and pressure after 30 days had a length of 300 mm, a width of 300 mm, a thickness of 15 mm, a foaming magnification rate of 28.6 times and a contraction rate of 96%.

EXAMPLE 7

A resin composition comprising a mixture of 100 parts by weight of an ethylene-vinyl acetate copolymer resin (manufactured by Mitsubishi Chemical Co., Ltd., trade name "MITSUBISHI PORIECHI-EVA LV660", a flexural modulus 150 kg/cm$^2$), and 0.2 part by weight of talc (manufactured by Nippon Talc Co., Ltd., "MS") as a cell core forming agent was melted and kneaded by a roller set at 120° C., and pressed for 5 minutes at a temperature of 120° C. and under a pressure of 150 kg/cm$^2$ to obtain a sheet having a thickness of 2 mm.

The obtained sheet was irradiated with electron beams of 500 KV×3 Mrad on both surfaces thereof to cross-link.

The obtained sheet was cut into a small piece of 100 mm in length and 100 mm in width. The small piece was filled into an autoclave; heated to 80° C. to melt; then supplied with a carbonic acid gas under a pressure of 50 kg/cm$^2$ to hold the state for one hour; and thereafter the pressure in the autoclave was reduced to normal pressure to foam in a shape of sheet.

The obtained resin foamed product was a sheet having a length of 305 mm, a width of 305 mm, a thickness of 6.3 mm, a forming magnification rate of 28.7 times and a closed cell rate of 88%.

Thereafter, a cut piece of the resin foamed product was held between pressing plates and pressed to be 3 mm in thickness. This state was held for two days. After two days, the pressing plates were removed to obtain a sheet of resin foamed product having a thickness of 3 mm.

The resin foamed product was cut into a piece of 300 mm in length and 300 mm in width.

The obtained resin foamed product as a heat-insulating material had a length of 300 mm, a width of 300 mm, a thickness of 3 mm, a foaming magnification rate of 13.9 times and a contraction rate of 48%.

Incidentally, the resin foamed product under normal temperature and pressure after 30 days had a length of 300 mm, a width of 300 mm, a thickness of 6 mm, a foaming magnification rate of 27.3 times and a contraction rate of 95%.

EXAMPLE 8

A resin composition comprising a mixture of 100 parts by weight of a high density polyethylene (manufactured by Mitsubishi Chemical Co., Ltd., trade name "MITSUBISHI PORIECHI-HD HJ560", a flexural modulus of 11,000 kg/cm$^2$), 0.6 part by weight of dicumyl peroxide (171° C. of one minute half-life period temperature), 0.5 part by weight of triallylisocyanulate (produced by Tokyo Kasei Kogyo Co., Ltd.) and 15 parts by weight of azodicarbonamide (a decomposition temperature of 198° C.) was melted and kneaded by a roller at a temperature of 140° C. for 7 minutes, and thereafter pressed at a temperature of 165° C. under a pressure of 150 kg/cm$^2$ for 15 minutes to obtain a cross-linked sheet in a thickness of 2 mm.

The cross-linked sheet was foamed in a shape of sheet in a hot air heating-type oven set at 250° C.

The obtained resin foamed product was a plate having a thickness of 6.5 mm, a foaming magnification rate of 31.1 times and a closed cell rate of 89%.

The resin foamed product was cut into a piece of 300 mm in length and 300 mm in width.

Thereafter, the cut piece of the resin foamed product was held between pressing plates, compressed to be 4 mm in thickness, and held for two days in the state. Two days later, the pressing plates were removed to obtain a sheet of the resin foamed product in a thickness of 4 mm.

The obtained resin foamed product as a heat-insulating material was a sheet having a length of 300 mm, a width of 300 mm, a thickness of 4 mm, a foaming magnification rate of 19.2 times and a contraction rate of 62%.

Incidentally, the resin foamed product under normal temperature and pressure after 30 days had a length of 300 mm, a width of 300 mm, a thickness of 6 mm, a foaming magnification rate of 28.7 times and a contraction rate of 92%.

EXAMPLE 9

A resin foamed product was prepared in the same manner as in Example 4 except that pentane as a foaming agent was supplied at a rate of 10 parts by weight against 100 parts by weight of the resin.

The resin foamed product was a rod having a diameter of 12 mm, a foaming magnification rate of 28.5 times and a closed cell rate of 92%.

Immediately after foaming, the resin foamed product was wound around a roller having a diameter of 300 mm, and placed in a normal temperature tank at a temperature of 23° C. for contraction to thereby obtain a rod-shape resin foamed product having a diameter of 7 mm.

The obtained resin foamed product as a sealing material was a rod having a diameter of 7 mm, a length of 300 mm, a foaming magnification rate of 9.7 times and a contraction rate of 34%.

Incidentally, the resin foamed product under normal temperature and pressure after 30 days had a diameter of 11.5 mm, a length of 300 mm, a foaming magnification rate of 26.0 times and a contraction rate of 92%.

EXAMPLE 10

A resin foamed product was prepared and compressed in the same manner as in Example 6 to thereby obtain a foamed product having a thickness of 8 mm.

The obtained foamed product was cut into a piece having a width of 15 mm.

The obtained resin foamed product as a sealing material had a width of 15 mm, a length of 310 mm, a thickness of 8 mm, a foaming magnification rate of 14.3 times and a contraction rate of 49%.

Incidentally, the resin foamed product under normal temperature and pressure after 30 days had a width of 15 mm, a length of 310 mm, a thickness of 15 mm, a foaming magnification rate of 28.0 times and a contraction rate of 94%.

EXAMPLE 11

A resin composition comprising a mixture of 100 parts by weight of a low density polyethylene (manufactured by Sumitomo Chemical Co., Ltd., trade name "SUMIKASEN G201)", 17 parts by weight of azodicarbonamide (manufactured by Ohtsuka Chemical Co., Ltd., trade name "UNIFORM AZ-H"), 1 part by weight of dicumyl peroxide (manufactured by Nippon Yushi Co., Ltd.) was kneaded by a roller set at a temperature of 140° C. for 5 minutes, and thereafter pressed at a temperature of 170° C. under a pressure of 150 kg/cm$^2$ for 7 minutes to obtain a cross-linked molded product having a length of 100 mm, width of 100 mm, and thickness of 20 mm.

Then, the cross-linked molded product was foamed in an oven set at 250° C. for 12 minutes.

The obtained resin foamed product had a foaming magnification rate of 32 times and a closed cell rate of 91%.

The resin foamed product was cut into a piece having 60 mm in length, 60 mm in width, 60 mm in thickness. The cut piece was pressed in two directions for 4 hours, respectively, to be 10 mm to thereby obtain an intended resin foamed product. The obtained resin foamed product had 60 mm in length, 31 mm in width and 32 mm in thickness.

Incidentally, the resin foamed product under normal temperature and pressure after 30 days had a foaming magnification rate of 29 times, and a dimension of 60 mm in length, 57 mm in width and 57 mm in thickness.

EXAMPLE 12

100 parts by weight of a low density polyethylene (manufactured by Mitsubishi Yuka Co., Ltd., trade name "ZH51") was supplied to a hopper of a vent-type extruder having a diameter of 65 mm (L/D=36) set at a temperature of 130° C.; carbonic acid gas was charged therein from a vent portion under a pressure of 100 kg/cm$^2$; and the mixture was extruded at a rate of 20 kg/hr to foam in a shape of rod through a die having a diameter of 2 mm and set at a temperature of 105° C.

The resin foamed product immediately after extrusion foaming had a foaming magnification rate of 28 times, a diameter of 22 mm and a closed cell rate of 83%.

The resin foamed product was cut into a piece in a length of 60 mm. A longitudinal direction of the cut piece was fixed by a mold frame to obtain a desired resin foamed product. The obtained resin foamed product had 60 mm in length and 13 mm in diameter.

Incidentally, the resin foamed product under normal temperature and pressure after 30 days had a foaming magnification rate of 27 times, a length of 60 mm and a diameter of 20 mm.

EXAMPLE 13

100 parts by weight of a low density polyethylene (manufactured by Mitsubishi Chemical Co., Ltd., trade name "MITSUBISHI PORIECHI-LD LF440HB") and 1 part by weight of talc (manufactured by Nippon Talc Co., Ltd., trade name "MS") were charged into a uniaxial extruder set at 130° C. and having a diameter of 65 mm; pentane was injected thereto at a rate of 10 parts by weight with respect to 100 parts by weight of the resin from a vent portion of the extruder; and then the kneaded substance was continuously extruded at an extruding rate of 20 kg/hr through an extruding die having a thickness of 4 mm and a width of 100 mm set at a temperature of 110° C. to foam in a shape of sheet. Subsequently, the foamed product was reformed to have a width of 100 mm and a thickness of 8 mm by a roller supplied with a lubricant to thereby obtain an intended resin foamed product.

The obtained resin foamed product had 100 mm in width and 8 mm in thickness. The resin foamed product was cut into a piece having 60 mm in length, 20 mm in width and 8 mm in thickness.

Incidentally, the resin foamed product under normal temperature and pressure after 30 days had a foaming magnification rate of 30 times, a closed cell rate of 83%, and a dimension of a length of 60 mm, a width of 57 mm and a thickness of 18 mm.

EXAMPLE 14

100 parts by weight of a low density polyethylene (manufactured by Mitsubishi Chemical Co., Ltd., trade name "MITSUBISHI PORIECHI-LD LF440HB") and 1 part by weight of talc (manufactured by Nippon Talc Co., Ltd., trade name "MS") were charged into a uniaxial extruder set at 130° C. and having a diameter of 65 mm; pentane was injected thereto at a rate of 10 parts by weight with respect to 100 parts by weight of the polyethylene; and then the kneaded substance was continuously extruded at an extruding rate of 20 kg/hr from an extrusion die having a thickness of 4 mm and a width of 100 mm to foam in a shape of sheet. Subsequently, the obtained foamed sheet was passed through a device (Portion A: 300 mm in width, 700 mm in length and 30 mm in height, Portion C: 100 mm in width, 500 mm in length and 8 mm in height) as shown in FIG. 1 to obtain a resin foamed product having a closed cell structure with a width of 100 mm and a thickness of 8 mm. The obtained resin foamed product was cut into a piece of 60 mm in length, 20 mm in width and 8 mm in thickness.

Incidentally, the resin foamed product under normal temperature and pressure after 30 days had a foaming magnification rate of 30 times, a closed cell rate of 82%, and a dimension of a length of 60 mm, a width of 58 mm and a thickness of 18 mm.

EXAMPLE 15

A resin composition comprising a mixture of 100 parts by weight of a low density polyethylene (manufactured by Sumitomo Chemical Co., Ltd., trade name "SUMIKASEN G201"), 17 parts by weight of azodicarbonamide (manufactured by Ohtsuka Chemical Co., Ltd., trade name "UNIFORM AZ-H") and 1 part by weight of dicumyl peroxide was kneaded by a roller set at a temperature of 140° C. for 5 minutes, and thereafter pressed at a temperature of 170° C. under a pressure of 150 kg/cm$^2$ for 7 minutes to obtain a cross-linked molded product having 100 mm in length, 100 mm in width and 20 mm in thickness.

Then, the cross-linked molded product was foamed in an oven at a temperature of 250° C. for 12 minutes.

The obtained resin foamed product had a foaming magnification rate of 32 times and a closed cell rate of 91%.

Figure 22A:
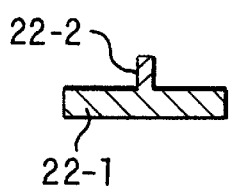
FIG. 22(a) is a perspective view of a resin foamed product of the present invention cut into a T-character shape for explaining a test method of a sealing property thereof.

The obtained resin foamed product was cut, as shown in FIG. 22(a), into a T-character shape having a dimension of 150 mm in length, 150 mm in width and 10 mm in thickness in a base portion 22-1; and 150 mm in width, 50 mm in height and 8 mm in thickness in a rib portion 22-2.

Figure 22B:
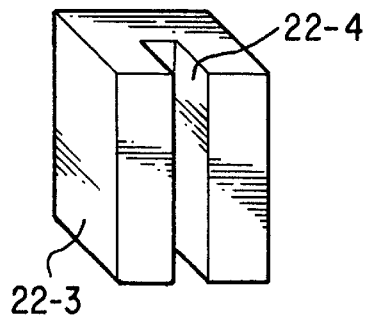
FIG. 22(b) is a perspective view of an acrylic container having a U-shape section for explaining the test method of the sealing property.
Figure 22C:
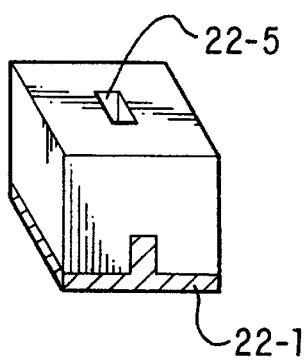
FIG. 22(c) is a perspective view for showing a state where the T-shaped resin foamed product of the invention is fixed to the acrylic container having the U-shape section, for explaining the test method of the sealing property.

The base portion 22-1 of the cut resin foamed product was fixed, and only the rib portion 22-2 was pressed in a thickness direction thereof for 3 hours to be 4 mm in thickness. A surface of the base portion 22-1 on the rib side of the obtained resin foamed product was coated with an adhesive agent, and the rib portion 22-2 was inserted into a notch 22-4 (6 mm in width and 50 mm in height) of an acrylic container (150 mm in length, 150 mm in width and 150 mm in depth) 22-3 having a U-character section, and then sealed, as shown in FIGS. 22(b), 22 (c). The notch portion 22-4 had a penetrating hole 22-5 (10 mm×6 mm) at an approximate center thereof. After 30 days, water was poured into the penetrating hole 22-5 to confirm whether the water leaked or not. There was no leakage.

EXAMPLE 16

100 parts by weight of a low density polyethylene (manufactured by Mitsubishi Chemical Co., Ltd., trade name "MITSUBISHI PORIECHI-LD LF440HB") and 1 part by weight of talc (manufactured by Nippon Talc Co., Ltd., trade name "MS") were charged into a monoaxial extruder set at 130° C. and having a diameter of 65 mm; pentane was injected thereto at a rate of 10 g with respect to 100 g of the resin from a vent portion; and subsequently the kneaded substance was continuously extruded at an extruding rate of 20 kg/hr from an extruding die set at a temperature of 110° C. and having a thickness of 4 mm and a width of 100 mm to foam in a shape of sheet and obtain a sheet-shape resin foamed product in a thickness of 15 mm. Subsequently, the obtained sheet-shape resin foamed product was passed through a double-belt having a thickness of 8 mm and a length of 2,000 mm to thereby contract.

Figure 23B:
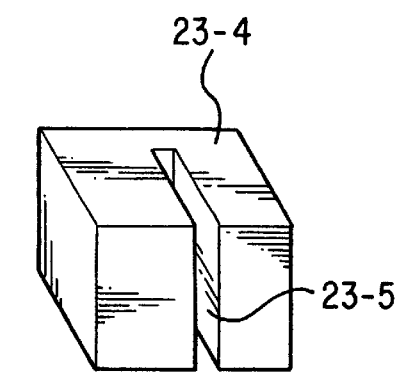
FIG. 23(b) is a perspective view of an acrylic container having a U-shaped section for explaining the test method of the sealing property.
Figure 23A:
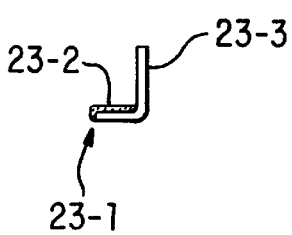
FIG. 23(a) is a section view of the resin foamed product of the present invention cut into an L-character for explaining the test method of the sealing property thereof.
Figure 23C:
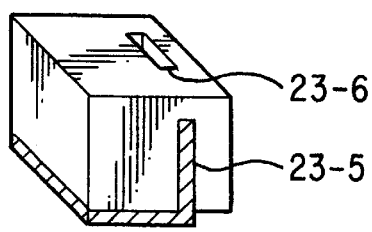
FIG. 23(c) is a perspective view for showing a state where the L-shaped resin foamed product is fixed to the acrylic container having the U-shaped section for explaining the test method of the sealing property.

The obtained resin foamed product was cut into a piece 23-1 having 160 mm in length, 160 mm in width and 8 mm in thickness as shown in FIG. 23(a). A half portion 23-2 divided by a central line parallel to one side of the piece 23-1 was heat-pressed for one minute at a temperature of 150° C. to melt-bond, and only the half portion was made a thickness of 5 mm. The half portion 23-2 was bent by 90° with respect to the other half 23-3 of the piece 23-1 which was not melt-bonded.

The other half 23-3 of the cut piece 23-1 which was not melt-bonded was inserted into a notch 23-5 (12 mm in width and 80 mm in height) provided to an acrylic container bonded 23-4 (150 mm in length, 150 mm in width and 150 mm in depth), and sealed. A penetrating hole 23-6 (12 mm×10 mm) was provided to the acrylic container 23-4 at an approximately center of the notch 23-5. After 30 days, water was poured through the penetrating hole to confirm whether the water leaked or not. There was no leakage.

EXAMPLE 17

A resin composition comprising a mixture of 100 parts by weight of an ethylene-vinylacetate copolymer (manufactured by Mitsubishi Chemical Co., Ltd., trade name "MITSUBISHI PORIECHI-EVA LV660", a flexural modulus of 150 kg/cm$^2$) and 1 part by weight of talc (manufactured by Nippon Talc Co., Ltd., trade name "MS") was kneaded by a roller set at 120° C., and thereafter was pressed for 7 minutes under a pressure of 150 kg/cm$^2$ at a temperature of 170° C. to obtain a sheet-shape molded product of a thickness of 2 mm.

Then, electron beam of 500 kv×3 Mrad was irradiated to both sides of the sheet-shape molded product to obtain a cross-linked molded product.

Then, the cross-linked molded product was put into an autoclave set at 80° C. and filled with a carbonic acid gas under a pressure of 50 kg/cm$^2$ for 1 hour and released in an atmospheric pressure to foam.

The obtained resin foamed product had a foaming magnification rate of 29 times, a closed cell rate of 88%, and a dimension of 100 mm in length, 100 mm in width and 6 mm in thickness.

The resin foamed product was pressed between pressing plates to be a thickness of 1 mm to thereby obtain an intended resin foamed product. Changes in thickness of the obtained resin foamed product are shown in Table 2.

EXAMPLE 18

A resin foamed product (manufactured by Sekisui Kaseihin Kabushiki Kaisha, trade name "RAITORON S, #512", a foaming magnification rate of 44 times, a closed cell rate of 90%) having a closed cell structure was cut into a piece having a dimension of 100 mm in length, 100 mm in width and 6 mm in thickness, and then pressed between pressing plates to be a thickness of 1 mm to thereby obtain an intended resin foamed product. Changes in thickness of the obtained resin foamed product are shown in Table 2.

TABLE 2

| | Changes in Thickness of Resin Foamed Products | | | | | | |
|---|---|---|---|---|---|---|---|
| No. of Days | 0 | 30 | 60 | 90 | 120 | 150 | 180 |
| Example 17 | 1.0 | 2.5 | 3.7 | 4.4 | 5.0 | 5.3 | 5.3 |
| Example 18 | 1.0 | 3.8 | 5.5 | 5.5 | 5.5 | 5.5 | 5.5 |

Comparison Example 1

A sheet-shape resin foamed product was prepared in the same manner as in Example 2 except that the foamed product was not held between the pressing plates to press.

The obtained resin foamed product as a heat insulating material had a dimension of 300 mm in length, 300 mm in width and 16 mm in thickness, a foaming magnification rate of 29.5 times and a contraction rate of 100%.

Incidentally, the magnification rates and the shape of the resin foamed product under normal temperature and pressure after 30 days did not change.

Comparison Example 2

A resin composition comprising a mixture of 100 parts by weight of a styrene-acrylonitrile resin (manufactured by Asahi Kasei Kogyo Co., Ltd., trade name "SUTAIRAKKU AS769", a flexural modulus of 34,000 kgf/cm$^2$) and 0.2 part by weight of talc (manufactured by Nippon Talc Co., Ltd., trade name "MS") was supplied to a hopper of a screw extruder (diameter of 50 mm, L/D=30), and was melted and kneaded in the extruder. A temperature in a cylinder of the extruder was set at 190° C., 205° C., 220° C. and 220° C. in this order from the hopper toward a forward end of the extruder.

Next, from a foaming agent injecting portion provided to a forward end of the screw, trichloromonofluoromethane as a foaming agent was charged into the extruder under pressure at a rate of 32 parts by weight with respect to 100 parts by weight of the resin; then the batch was fully cooled to a temperature of 110° C.; extruded in a strand-shape through a die having a plurality of nozzles of 0.8 mm in diameter at an extruding rate of 5 kg/hr; the strand-shaped products were immediately cooled with water; and cut by a cutter into pellet-shape unfoamed resin particles having a diameter of 1 mm and a length of 3 mm.

The obtained foamable resin particles were left to be matured at a room temperature; then heated by steam at a gauge pressure of 0.3 kg/cm² for 45 seconds to foam; and thereafter cooled to 10° C. After 10 minutes, a contracted resin foamed product was obtained.

The obtained resin foamed products as an insulating material had a foaming magnification rate of 35.5 times and a contraction rate of 20%.

Incidentally, the resin foamed product under normal temperature and pressure after 30 days had a foaming magnification rate of 164 times, a closed cell rate of 92% and a contraction rate of 94%.

Comparison Example 3

A resin foamed product was prepared in the same manner as in Example 2 except that the resin foamed product was not compressed.

The resin foamed product was cut into a piece of 15 mm in width.

The obtained resin foamed product as a sealing material had a dimension of 15 mm in width, 310 mm in length and 16 mm in thickness, a foaming magnification rate of 29.5 times and a contraction rate of 100%.

Incidentally, the resin foamed product under normal temperature and pressure after 30 days did not have any change in the magnification rates and the shape.

Incidentally, the resin foamed product under normal temperature and pressure after 30 days had a foaming magnification rate of 26.0 times and a contraction rate of 52%.

Heat Insulating Property:

Properties as heat insulating materials of the resin foamed products obtained in Examples 1, 2, 6–8 and Comparison Examples 1 and 2 were evaluated. The evaluations were carried out by the following methods.

Heat Insulating Property: measured according to JIS A 1412, A Method for Measuring a Coefficient of Thermal Conductivity of a Heat-Insulating Material. However, the measuring was carried out after expansion, i.e. 30 days later.

With reference to Comparison Example 2, a wooden frame having an inner dimension of 200 mm in length, 200 mm in width and 25 mm in depth was prepared, into which the chip-shape resin foamed products were packed, and a coefficient of thermal conductivity was measured after expansion, i.e. 30 days later.

Applicability: A resin foamed product was cut into a piece having 300 mm in length and 300 mm in width; the piece was filled in a container made of an acrylic plate having a space of 300 mm in length, 300 mm in width and 30 mm in depth; and a functionality with respect to the workability when a lid was put thereon was evaluated.

Filling Property: A space between a heat insulating material obtained from a foamed product and an inner wall of a container was observed through a visual observation.

The results of the above are shown in Table 3.

TABLE 3

|  |  | Dimension when applied (mm) | | | | Thermal conductivity | Filing |  |
| --- | --- | --- | --- | --- | --- | --- | --- | --- |
|  |  | Length | Width | Thickness | (4) | (kcal/m/° C./hr) | property | Applicability |
| Exa. | 1 | 300 | 300 | 15 | 1 | 0.032 | ○ | ○ |
|  | 2 | 300 | 300 | 8 | 2 | 0.032 | ○ | ○ |
|  | 6 | 300 | 300 | 5.5 | 2 | 0.031 | ○ | ○ |
|  | 7 | 300 | 300 | 3 | 5 | 0.030 | ○ | ○ |
|  | 8 | 300 | 300 | 4 | 5 | 0.032 | ○ | ○ |
| Com. Exa. | 1 | 300 | 300 | 16 | 2 | 0.032 | x: (1) | x: (2) |
|  | 2 | Chip shape filing | | | | 0.045 | x: (3) | ○ |

(1) A space between the heat insulating material and the container was created.
(2) The lid was difficult to be put on.
(3) Spaces among chips were created.
(4) Sheet Comparison Example 4

Chip-shape foamed products were prepared in the same manner as in Comparison Example 2 except that steam heating was carried out for 20 seconds.

The obtained resin foamed products had a foaming magnification rate of 51 times and a closed cell rate of 97%.

Thereafter, the resin foamed products were cooled to 10° C. but did not contract.

Since the chip-shape resin foamed products did not contract, the chip-shape resin foamed products were held between pressing plates, pressed to be approximately a half of the thickness, and held in its state for one hour. After one hour, the pressing plates were removed to obtain contracted chip-shape resin foamed products.

The obtained resin foamed products as an insulating material had a foaming magnification rate of 25.9 times and a contraction rate of 51%.

Sealing Property

Properties as a sealing material were evaluated with respect to the resin foamed products obtained in Examples 3–5, 9 and 10 and Comparison Examples 2–4. The evaluations were carried out by the following methods.

Figure 12:
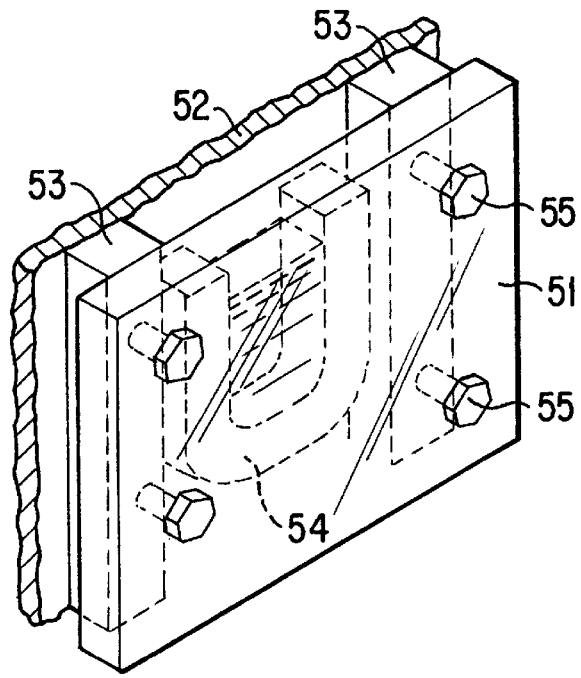
FIG. 12 is a perspective view for explaining a method for testing a sealing property.

Sealing Property: As shown in FIG. 12, a resin foamed product 54 as a sealing material was bent in a shape of U-character and affixed on one side of a transparent acrylic resin plate 51 having 150 mm in length and 200 mm in width by a both-side adhesive tape; an embossed steel plate 52 was disposed on the side where the sealing material was affixed, of the acrylic resin plate 51; and two vertical spacers 53 were provided between the acrylic resin plate 51 and the embossed steel plate 52 so that a space between the acrylic resin plate 51 and the embossed steel plate 52 was held in a thickness of 10 mm by bolts 55 and the spacers 53. Water was poured into an interior of the U-character of the resin foamed product 54 as a sealing material to a height of 55 mm and the state was held for 24 hours to observe whether the water leaked or not.

In this connection, the evaluation was carried out after expansion, i.e. after 30 days from the time when the resin foamed product 54 was held between the acrylic resin plate 51 and the embossed steel plate 52.

Applicability: A functionality with respect to the workability when a resin foamed product as a sealing material was packed into a groove having a width of 10 mm and a depth of 20 mm was evaluated. The above results are shown in Table 4.

TABLE 4

| | Measurement when applied (mm) | | Sealing property | Applicability |
|---|---|---|---|---|
| | thickness | width | | |
| Exa. 3 | 8 | 15 | ○ | ○ |
| Exa. 4 | Ø7 | — | ○ | ○ |
| Exa. 5 | 8 | 15 | ○ | ○ |
| Exa. 9 | Ø7 | — | ○ | ○ |
| Exa. 10 | 8 | 15 | ○ | ○ |
| Com. Exa. 2 | Chip shape | | x:(4) | ○ |
| Com. Exa. 3 | 16 | 15 | ○ | x:(5) |
| Com. Exa. 4 | Chip shape | | x:(4) | ○ |

(4) Water leakage
(5) Difficult packing

Sealing Property

For Examples 11–14 and Comparison Example 2, after a contracted resin foamed product was placed in an acrylic container (the dimension is shown in Table 5) having a water feeding port of 10 mm in diameter at a central upper portion of the container and a water discharging port of 10 mm in diameter at a central lower portion thereof, and water was supplied through the water feeding port after 30 days to observe leakage of the water from the water discharging port.

Coefficient of Thermal Conductivity: measured according to JIS A 1412

Applicability: evaluated with respect to the container for evaluating the sealing property.

Sealing Property: no leakage is shown by O and leakage is shown by X.

The results are shown in Table 5.

PORIECHI-LD LF440HB") and 1 part by weight of talc was supplied to a hopper of a vent-type extruder (L/D=36) having a diameter of 65 mm and set at a temperature of 140° C.; flon 142$b$ was injected thereto from a vent portion at a rate of 550 g/hr; and the mixture was extruded, at an extruding rate of 12 kg/hr from a die set at a temperature of 108° C. and having a diameter of 2 mm, in a shape of rod to foam. The die was directly connected to a decompression chamber set at 200 mmHg. Then, a resin foamed product was obtained by foaming in the decompression chamber at a foaming magnification rate (B) of 35.0 times to have a diameter of 14 mm; and after a lubricant oil was sprayed, the resin foamed product was exposed to the atmosphere. The decompression chamber had an exit of 14 mm in diameter and was set at a temperature of 60° C. When exposed to the atmosphere, the resin foamed product had a foaming magnification rate of 9.8 times and a diameter of 9.0 mm.

After 30 days, the resin foamed product had a foaming magnification rate of 34.0 times, a diameter of 13.8 mm and a closed cell rate of 88%.

When the above resin foamed product was foamed under 1 atm, the obtained resin foamed product had a foaming magnification rate (A) of 9.6 times, a diameter of 9.0 mm and a closed cell rate of 85%.

Thus, the foaming magnification rate: B/A=35/9.6=3.6.

Comparison Example 5

A resin composition comprising a mixture of 100 parts by weight of a low density polyethylene (manufactured by Mitsubishi Chemical Co., Ltd., trade name "MITSUBISHI PORIECHI-LD LF440HB") and 1 part by weight of talc was supplied to a hopper of a vent-type extruder (L/D=36) having a diameter of 65 mm and set at a temperature of 140° C.; flon 142$b$ was injected thereto from a vent portion at a rate of 1,800 g/hr; and the mixture was extruded, at an extruding rate of 12 kg/hr from a die set at a temperature of 108° C. and having a diameter of 2 mm, in a shape of rod to foam. The obtained resin foamed product had a foaming magnification rate of 34.6 times, a diameter of 14 mm and a closed cell rate of 86%. Property Evaluation With respect to the rod-shape resin foamed products obtained in Example 19 and Comparison Example 5, properties as a buffer material were evaluated. The results are shown in Table 6.

The evaluation was carried out in the follow method.

TABLE 5

| | | Dimension when applied (mm) | | | Dimension of Container (mm) | | | Thermal conductivity | | |
|---|---|---|---|---|---|---|---|---|---|---|
| | | Length | width | Thickness | Length | width | Depth | (kcal/mm/° C./hr) | (1) | (2) |
| Exa. | 11 | 60 | 31 | 32 | 60 | 50 | 50 | 0.032 | ○ | ○ |
| | 12 | | 60 × ø13 | | | 60 × ø20 | | 0.034 | ○ | ○ |
| | 13 | 60 | 20 | 8 | 60 | 50 | 15 | 0.031 | ○ | ○ |
| | 14 | 60 | 20 | 8 | 60 | 50 | 15 | 0.031 | ○ | ○ |
| Com. Exa. 2 | | Chip shape | | | 50 | 50 | 50 | 0.045 | x | ○ |

(1) Applicability
(2) Sealing property

EXAMPLE 19

(Example 19 and Comparison Example 5 correspond to Invention 5).

Figure 13:
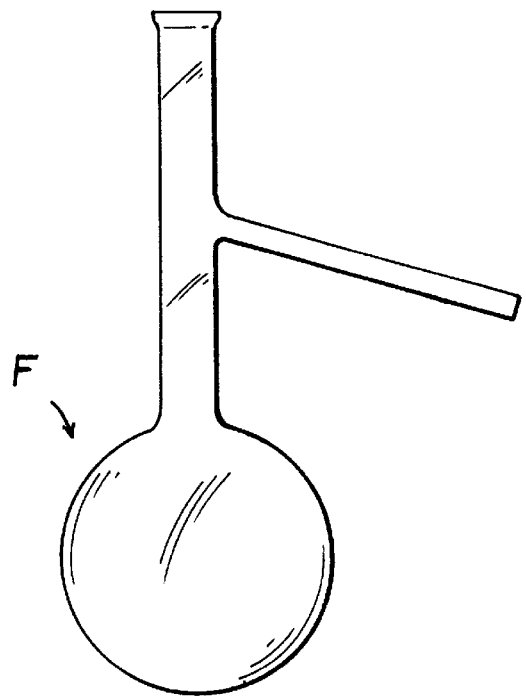
FIG. 13 is a front view for showing a flask with a branch used for evaluating a buffer property.

A resin composition comprising a mixture of 100 parts by weight of a low density polyethylene (manufactured by Mitsubishi Chemical Co., Ltd., trade name "MITSUBISHI Buffer Property: in a wooden box having 300 mm in length, 500 mm in width and 300 mm in depth, by using the foamed rods as a buffer material, a flask (capacity of 30 ml, manufactured by Ogura Garasu Kogyo Co., Ltd.) F with a branch as shown in FIG. 13 was packed. Immediately after the flask was packed, the box was vibrated by a vibrator with an amplitude of 5 cm at a vibrating rate of two reciprocations per a second for one hour; thereafter, one hour vibration every 24 hours for one week, and then the wooden box was fallen down from a height of 1 meter to evaluate damage of the flask F with the branch.

TABLE 6

| Example 19 | No damaged sample out of 10 samples |
| Com. Example 5 | 8 damaged samples out of 10 samples |

EXAMPLE 20

(Example 20 and Comparison Example 6 correspond to invention 6.)

A resin composition comprising a mixture of 100 parts by weight of a low density polyethylene (manufactured by Mitsubishi Chemical Co., Ltd., trade name "MITSUBISHI PORIECHI-LD LF440HB"), 5 parts by weight of azodicarbonamide (decomposition temperature of 198° C.), and 1 part by weight of zinc stearate was kneaded by a roller at a temperature of 140° C. for 5 minutes, and pressed under a pressure of 100 kg/cm² at a temperature of 140° C. for 5 minutes to obtain a sheet of 150 mm in length, 150 mm in width and 2 mm in thickness. Electron bean of 500 kv×6 Mrad was irradiated on both surfaces of the obtained sheet to cross-link.

The cross-linked sheet was placed in an oven at a temperature of 230° C. for 5 minutes to foam. The obtained sheet-shape resin foamed product had a foaming magnification rate of 10.1 times, a thickness of 4.3 mm, a closed cell rate of 95%. Then, immediately thereafter, the sheet-shape foamed product was placed in an oven at a temperature of 150° C. under 180 mmHg for 30 seconds; and then, in the oven, was cooled to a temperature of 60° C. Thereafter, the resin foamed product was sandwiched between iron plates having a thickness of 3 mm; a weight was placed thereon so that a load of 1 kg/cm² was applied to the resin foamed product; and then, the sheet-shape resin foamed product was taken out therefrom. The sheet-shape resin foamed product had a foaming magnification rate of 9.8 times and a thickness of 2.3 mm.

Incidentally, the sheet-shape resin foamed product under normal temperature and pressure after 30 days had a thickness of 6.4 mm and a foaming magnification rate of 35 times.

Comparison Example 6

A resin composition comprising a mixture of 100 parts by weight of a low density polyethylene (manufactured by Mitsubishi Chemical Co., Ltd., trade name "MITSUBISHI PORIECHI-LD LF440HB"), 19 parts by weight of azodicarbonamide (decomposition temperature of 198° C.) and 1 part by weight of zinc stearate was kneaded by a roller at a temperature of 140° C. for 5 minutes, and pressed under a pressure of 100 kg/cm² at a temperature of 140° C. for 5 minutes to obtain a sheet of 150 mm in length, 150 mm in width and 2 mm in thickness. Electron bean of 500 kv×6 Mrad was irradiated on both surfaces of the obtained sheet to cross-link.

The cross-linked sheet was placed in an oven at a temperature of 230° C. for 5 minutes to foam. The obtained sheet-shape resin foamed product had a foaming magnification rate of 39 times, a thickness of 6 mm and a closed cell rate of 85%.

Incidentally, the sheet-shape resin foamed product after 30 days had the same shape and foaming magnification rate as those immediately after production.

With respect to the sheet-shape resin foamed products obtained in Example 20 and Comparison Example 6, properties as a buffer material were evaluated. The results are shown in Table 7.

The evaluations were carried out in the follow methods.

Heat insulating property: coefficients of thermal conductivity of the sheet-shape resin foamed products at a temperature of 0° C. after 30 days were measured.

Applicability: a sheet-shape resin foamed product was cut into piece having 300 mm in length and 300 mm in width; the cut piece was placed in a container made of an acrylic plate and having a space of 300 mm in length, 300 mm in width and 6 mm in depth; and functionality with respect to workability when a lid was put on was measured.

Filling Property: A filling property of the obtained resin foamed product after 30 days was tested through a visual observation.

TABLE 7

| | Thickness of foamed product when applied (mm) | Applicability | After 30 days | |
| --- | --- | --- | --- | --- |
| | | | Thermal Conductivity | Filling Property |
| Example 20 | 2.0 | ○ | 0.032 | no space |
| Comparison Example 6 | 6.0 | X space in bottom | 0.032 | space |

○: Easy applicability
X: Difficult applicability

EXAMPLE 21

(Examples 21, 22 and Comparison Example 7 correspond to invention 7)

A resin foamed product (manufactured by Sekisui Kagaku Kogyo Kabushiki Kaisha, trade name "SOFUTORON BOARD", 90 mm in thickness, 30 times in foaming magnification rate) having a closed cell structure and made of a low density polyethylene was cut into a sphere having a diameter of 80 mm; the sphere was left in a decompression chamber under 50 mmHg at a temperature of 25° C. for 12 hours; and then taken out from the decompression chamber to obtain a resin foamed product having a contracted foaming magnification rate of 10 times and a diameter of 26 mm.

The resin foamed product gradually recovered its shape, and after about 80 days, became a sphere of 72 mm in diameter. Also, at that time, the sphere had a foaming magnification rate of 27 times.

EXAMPLE 22

A resin foamed product (manufactured by Sekisui Kagaku Kogyo Kabushiki Kaisha, trade name "SOFUTORON BOARD", 90 mm in thickness, 30 times in foaming magnification rate) having a closed cell structure and made of a low density polyethylene was cut into a rectangle having a length of 100 mm, a width of 100 mm and a thickness of 90 mm; the rectangular foamed product was left in a container filled with carbonic acid gas at a temperature of 25° C. under a pressure of 10 kg/cm² for 24 hours; then taken out from the container; and a load of 5 kg/cm² was applied on the rectangular foamed product in a thickness direction to obtain a resin foamed product.

The resin foamed product obtained by removing the load had 100 mm in length, 100 mm in width and 20 mm in thickness. The resin foamed product was left under normal temperature and pressure for 60 days to thereby recover a thickness of 72 mm in its shape.

Comparison Example 7

A resin composition comprising a mixture of 100 parts by weight of a styrene-acrylonitrile copolymer (manufactured by Asahi Kasei Kogyo Co., Ltd., trade name "SUTAIR-AKKU AS769") and 0.2 part by weight of talc (manufactured by Nippon Talc Co., Ltd., trade name "MS") was supplied to a hopper of a screw extruder (diameter of 50 mm, L/D=30), and was melt-kneaded in the extruder. Temperatures in a cylinder of the extruder were set at 190° C., 205° C., 220° C. and 220° C. in this order from the hopper toward a forward end of the extruder.

Then, trichloromonofluoromethane as a foaming agent was injected thereto from a foaming agent injecting portion provided at a forward end of the screw at a rate of 32 g with respect to 100 g of the resin composition; subsequently, the mixture was fully cooled to a temperature of 100° C.; then, extruded in a shape of strand through a die having a plurality of nozzles with a diameter of 0.8 mm at a rate of 5 kg/hr; immediately thereafter the strand-shape products were cooled; and then cut by a cutter to obtain pellet-shape unfoamed particles having a diameter of 1 mm and a length of 3 mm.

The pellet-shape unfoamed particles were left at a room temperature to mature, and then heated for 45 seconds in a steam atmosphere under a gauge pressure of 0.3 kg/cm$^2$ to foam. The obtained resin foamed product was cooled to a temperature of 10° C., and 10 minutes later, was naturally contracted in a three-dimensional direction to thereby obtain a resin foamed product having a shape recoverable property.

The obtained resin foamed product had a diameter of 3.3 mm, a length of 9.5 mm, a foaming magnification rate of 35.5 times and a closed cell rate of 92%.

The resin foamed product was left under normal temperature and pressure for 30 days, and its shape was three-dimensionally recovered to have a diameter of 5.5 mm, a length of 16 mm and a foaming magnification rate of 164 times.

A sealing property and an applicability of the resin foamed products obtained in Example 22 and Comparison Example 7 were measured. The results are shown in Table 8.

Incidentally, the sealing property was measured in the following manner. A foamed product was inserted into an angular tube portion having 100 mm of $L_1$, 100 mm of $L_2$ and 50 mm of $L_3$, and left for 60 days. Then, when water was poured from a water feeding pipe disposed to orthogonally cross an upper portion of the angular tube portion toward a drain pipe provided at a lower portion of the angular tube portion, if water leaked from the drain pipe, X mark was used, and if no water leaked from the drain pipe, O mark was used.

TABLE 8

|  | Sealing Property | Applicability |
| --- | --- | --- |
| Example 22 | O | O |
| Comparison Example 7 | X | O |

EXAMPLE 23

(Examples 23–25 and Comparison Example 8 correspond to inventions 8 and 9.)

100 parts by weight of a low density polyethylene (manufactured by Sumitomo Chemical Co., Ltd., trade name "G201"), 20 parts by weight of azodicarbonamide (decomposition peak temperature of 198° C.) as a foaming agent and 2 parts by weight of zinc stearate were charged into a monoaxial extruder having a diameter of 65 mm and set at a temperature of 135° C., and kneaded. Then, the kneaded substance was extruded into a sheet having a thickness of 2.4 mm, and electron beam having 750 kv×5 Mrad was irradiated on both surfaces of the sheet to cross-link. The cross-linked substance was heated at a temperature 240° C. to foam and obtain a resin foamed product having a thickness of 8 mm, a foaming magnification rate of 41 times, 720 $\mu$m of an average cell diameter and a closed cell rate of 80%.

The obtained resin foamed product was cut into a piece of 100 mm in length and 100 mm in width, and gas permeating holes penetrating through the cut piece were made by using needles having a diameter of 500 $\mu$m with an interval of 10 mm, i.e. at a hole-making density of 1 hole/cm$^2$.

Then, the resin foamed product with the holes was compressed between pressing plates provided with spacers having a thickness of 1 mm, and left for 12 hours in its state to obtain a resin foamed product.

The obtained resin foamed product had 100 mm in length, 100 mm in width, 1 mm in thickness, and 12.5% in contracting rate.

EXAMPLE 24

A resin foamed product was prepared in the same manner as in Example 23 except that the air permeating holes were provided at an interval of 5 mm, i.e. at a hole-making density of 4 holes/cm$^2$.

EXAMPLE 25

A resin foamed product was prepared in the same manner as in Example 23 except that the air permeating holes were provided at an interval of 2.5 mm, i.e. at a hole-making density of 16 holes/cm$^2$.

Comparison Example 8

A resin foamed product was prepared in the same manner as in Example 23 except that the air permeating holes were not provided.

The resin foamed products obtained in Examples 23–25 and Comparison Example 8 were left in an atmosphere; the number of days required until the shape recoveries were terminated were measured; and the contraction rates when the shape recoveries terminated were also measured. The results are shown in Table 9.

TABLE 9

|  | Number of Days to Recover Shape (days) | Contraction rate (%) |
| --- | --- | --- |
| Example 23 | 50 | 96 |
| Example 24 | 13 | 96 |
| Example 25 | 2.5 | 96 |
| Com. Example 8 | 90 | 95 |

EXAMPLE 26

(Examples 26 and 27 and Comparison Example 9 correspond to invention 10.)

Figure 14:
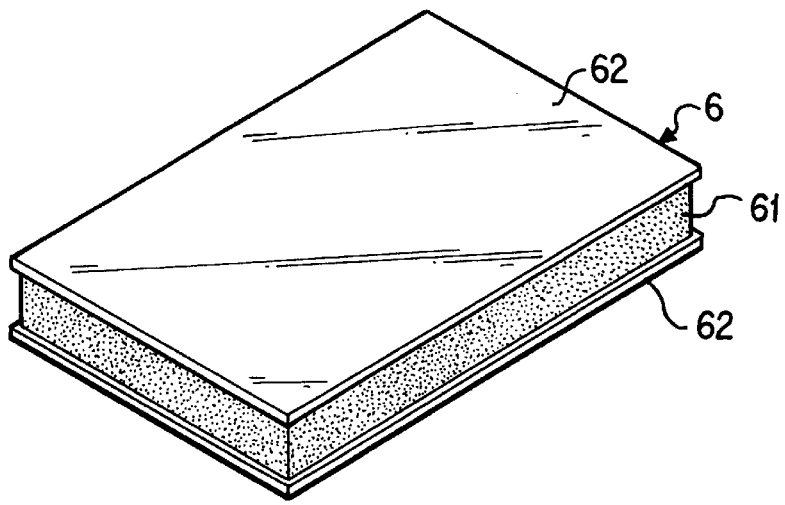
FIG. 14 is a section view for showing an example of a laminated structure of the present invention.

A resin foamed product (foaming magnification rate of 20 times, 500 mm in length, 500 mm in width, 10 mm in thickness, closed cell rate of 85%), which constitutes a foaming layer, obtained by foaming a low density polyethylene (manufactured by Mitsubishi Yuka Co., Ltd., trade name "ZC30") with a carbonic acid gas was melt-bonded on both surfaces thereof by polypropylene sheets (manufactured by Mitsubishi Kasei Co., Ltd., trade name "MITSUBISHI PORIPURO 4300J", 520 mm in length, 520 mm in width, 0.5 mm in thickness, a gas permeability coefficient of $(CO_2) 3.45 \times 10^{-14}$ cm$^3$/atm·sec·cm$^2$, a flexural rigidity 18 g·cm) as a covering layer. Then, as shown in FIG. 14, the covering layers 62, 62 were integrally provided on both surfaces of the foaming layer 61 to form a laminated structure 6. After 7 hours, a thickness of the laminated structure 6 was recovered to about 8 mm, and no creases nor bendings were observed.

EXAMPLE 27

A sheet-shape resin foamed product (foaming magnification rate of 30 times, 400 mm in length, 400 mm in width, 10 mm in thickness, closed cell rate 83%) as a resin foaming layer obtained by heat-foaming a sheet formed by cross-linking a low density polyethylene (manufactured by Mitsubishi Yuka Co., Ltd., trade name "ZC30") containing azodicarbonamide (manufactured by Ohtsuka Kagaku Co., Ltd., trade name "UNIFORM SOL") as a foaming agent through irradiation of an electron beam, was melt-bonded on both surfaces thereof with low density polyethylene sheets (manufactured by Mitsubishi Sekiyu Kagaku Co., Ltd., trade name "ULTRAZEX" 1520L", 420 mm in length, 420 mm in width, 0.5 mm in depth, a gas permeability coefficient of ($N_2$)$3.65 \times 10^{-15}$ $cm^3$/atm·sec·$cm^2$, a flexural rigidity of 15 g·cm) as a covering layer to thereby obtain a laminated structure.

The laminated structure was compressed to be one tenths by a pressing machine, left for four days in its state, and removed from the pressing machine to thereby obtain a laminated structure of a thickness 4 mm. Incidentally, the obtained compressed laminated structure was found to have no creases nor bendings.

Thereafter, the laminated structure was left in an atmosphere for 30 days. Although a thickness of the laminated structure was recovered up to about 8 mm, the laminated structure after recovery was found to have no creases nor bendings.

Comparison Example 9

In case the resin foamed product used in Example 26 was not laminated with any covering layer, the thickness thereof was naturally contracted up to 3 mm for 30 minutes in three dimensions. Therefore, the resin foamed product had creases and distortions on the surfaces, so that an intended resin foamed product could not be obtained.

Incidentally, the resin foamed product at a time of contraction had 350 mm in length and 350 mm in width, and at a time of recovery after 30 days, 470 mm in length, 470 mm in width and 8 mm in thickness. At this time point, also, some creases were observed on the surfaces of the foamed product.

EXAMPLE 28

(Example 28–31 and Comparison Examples 10–13 correspond to inventions 11–13.)

A resin foamed product (foaming magnification rate of 20 times, 500 mm in length, 500 mm in width, 10 mm in thickness, closed cell rate of 85%) obtained by foaming, with carbonic acid gas, a low density polyethylene (manufactured by Mitsubishi Yuka Co., Ltd., trade name "ZC30") was melt-bonded, on both surfaces thereof, with an olefin based elastomer [manufactured by Mitsubishi Sekiyu Kagaku Co., Ltd., trade name "GUDOMA-S 500", 500 mm in length, 500 mm in width and 1.0 mm in thickness, hardness 50 (JIS K 6301), at a gas permeating quantity of $2.5 \times 10^{-10}$ $cm^3$ (gas permeating quantity per 500 mm in length, 500 mm in width and 1.0 mm in thickness)] at a temperature of 130° C. to obtain a laminated structure.

After 7 hours, the laminated structure was subjected to a natural contraction through gas permeation to thereby naturally contract up to 460 mm in length, 460 mm in width and 3 mm in thickness, and after 30 days, the laminated structure was recovered up to about 490 mm in length, 490 mm in width and 8 mm in thickness.

Figure 15:
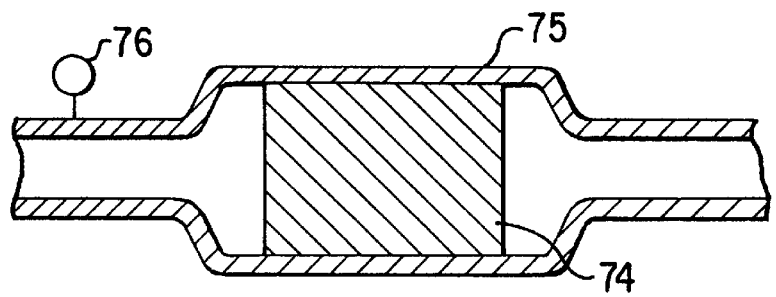
FIG. 15 is a section view for showing a state where an air permeating quantity of the laminated structure is measured.

As shown in FIG. 15, the laminated structure 74 was surrounded by four metal plates (surface coarse being 0.4 in terms of central line average coarse) 75 from four directions to thereby contract up to 480 mm in length, 480 mm in width and 7 mm in thickness. As shown in FIG. 15, an air flow quantity when a pressure corresponding to the standard atmospheric pressure was applied from one side of the laminated structure was measured by a flow meter 76, and found to be 0 $cm^3$/$cm^2$/S.

EXAMPLE 29

A sheet-shape resin foamed product (foaming magnification rate of 30 times, 480 mm in length, 480 mm in width, 10 mm in thickness, closed cell rate 83%) formed by heat-foaming a sheet obtained by cross-linking, through irradiation of electron beam, a low density polyethylene (manufactured by Mitsubishi Yuka Co., Ltd., trade name "ZC30") containing azodicarbonamide (manufactured by Ohtsuka Kagaku Co., Ltd., trade name "UNIFORM SOL") as a foaming agent, was melt-bonded on both surfaces thereof with a styrene based elastomer [manufactured by Asahi Kasei Kogyo Co., Ltd., trade name "TAFUTEX S2274", 480 mm in length, 480 mm in width, 1.0 mm in thickness, 70 in hardness (JIS K 6301), gas permeating quantity of $2.5 \times 10^{-10}$ $cm^3$ (gas permeating quantity per 480 mm in length, 480 mm in width and 1.0 mm in thickness)] at a temperature of 130° C. to obtain a laminated structure. Thereafter, the laminated structure was compressed to be one tenths in a thickness direction by a pressing machine, and held in its state for 4 days.

The laminated structure taken out from the pressing machine had a thickness of 4 mm, and after 30 days, the thickness was recovered to 8 mm.

By using the obtained laminated structure and the device as shown in FIG. 15, in the same manner as in Example 28, an air flow quantity permeated when a pressure corresponding to the standard atmospheric pressure was applied from one side of the laminated structure was measured by a flow meter 76, and found to be 0 $cm^3$/$cm^2$/S.

EXAMPLE 30

A resin foamed product (foaming magnification rate of 20 times, 400 mm in length, 400 mm in width, 10 mm in thickness, closed cell rate of 85%) obtained by foaming, with a carbonic acid gas, a low density polyethylene (manufactured by Mitsubishi Yuka Co., Ltd., trade name "ZC30") was laminated with metal meshes [manufactured by Nichidai Co., Ltd., trade name "POAFURO", a standard lattice hole diameter of 5 μm, 4 sheets, 480 mm in length, 480 mm in width, a gas permeating quantity of 167 $cm^3$/$cm^2$/s (under a standard atmospheric pressure)] in a state heated to 150° C. to thereby obtain a laminated structure having the resin foamed product as a melting layer.

After two hours, the laminated structure was naturally contracted up to three tenths through gas permeation. After 30 days, the thickness of the laminated structure was recovered up to about 6 mm.

EXAMPLE 31

A sheet-shape resin foamed product (foaming magnification rate of 30 times, 300 mm in length, 300 mm in width, 10 mm in thickness, closed cell rate of 83%) obtained by heat-foaming (a method described in "PLASTIC FOAM HANDBOOK", PP 118–121, published in 1973 by Nikkan Kogyo Shinbun Co., Ltd., a heating temperature of 180° C.) a sheet formed by cross-linking, with irradiation of electron beam, a low density polyethylene (manufactured by Mitsubishi Yuka Co., Ltd., trade name "ZC30") containing azodicarbonamide (manufactured by Ohtsuka Kagaku Co., Ltd., trade name "UNIFORM SOL") as a foaming agent, was laminated with aluminum foils (manufactured by Sumikei Aluminum Foil Co., Ltd., 300 mm in length and 300 mm in width, 15 μm in thickness) having holes of 0.5 mm in diameter at a density of 0.1 hole/cm² made by needles to thereby have a gas permeating quantity of 0.2 cm³/cm²/s (under a standard atmospheric pressure).

Then, the laminated structure was compressed by a pressing machine to one tenths, held for 4 days in its state, and then taken out from the pressing machine to have a thickness of 4 mm. After 30 days, the thickness was recovered to 7 mm.

Comparison Example 10

In case the resin foamed product used in Example 28 was not laminated thereon with anything, after 30 minutes, the foamed product was naturally contracted to have 420 mm in length, 420 mm in width and 3 mm in thickness, and after 30 days, was recovered to be 490 mm in length, 490 mm in width and 8 mm in thickness. By using the obtained resin foamed product and the device as shown in FIG. 15, in the same manner as in Example 28, an air flow quantity when a pressure corresponding to the standard atmospheric pressure was applied from one side of the foamed product was measured by the flow meter 76, and found to have a flow quantity of $2.5 \times 10^{-5}$ cm³/cm²/s.

Comparison Example 11

A standard foamed product (polystyrene, foaming magnification rate of 30 times, 20 mm in length, 20 mm in width, 10 mm in thickness and closed cell rate of 83%) was filled in a space; and an air permeating quantity thereof was measured in the same manner as in Example 28 and found to be $1.5 \times 10^{4}$ cm³/cm²/s.

Comparison Example 12

The resin foamed product used in Example 28 without lamination thereon was compressed by a pressing machine to be one tenths as in Example 28, and held in its state for 4 days. The resin foamed product was removed from the pressing machine, and found to have 4 mm in thickness. After 30 days, the thickness was recovered up to 9 mm. An air flow quantity when the resin foamed product after recovery was compressed under a pressure of 0.01 kgf/cm² was measured in the same manner as in Example 28, and found to be 0 cm³/cm²/s.

Comparison Example 13

A soft urethane foamed product (open-cell foamed product manufactured by Inoakku Corporation, trade name "MORUTOPUREN SC", 300 mm in length, 300 mm in width and 8 mm in thickness) obtained by subjecting chloroparaffin to a 30% impregnation treatment was compressed to three tenths, and a thickness thereof was recovered to 8 mm at a normal temperature after 2 days.

An air flow quantity when the recovered resin foamed product was compressed under a pressure of 0.01 kgf/cm² was measured in the same manner as in Example 28, and found to be $7.0 \times 10^{-4}$ cm³/cm²/s.

It is found that the laminated structures in Examples 28–31 of the present invention have an excellent sealing property, and moreover compared with the resin foamed products of Comparison Examples 10 and 12, shape recovering times thereof can be delayed. Therefore, the laminated structures of the present invention can be stored for a long time and used for various purposes. Further, applicability thereof can be improved.

EXAMPLE 32

(Example 32 and Comparison Example 14 correspond to invention 14.)

Figure 16:
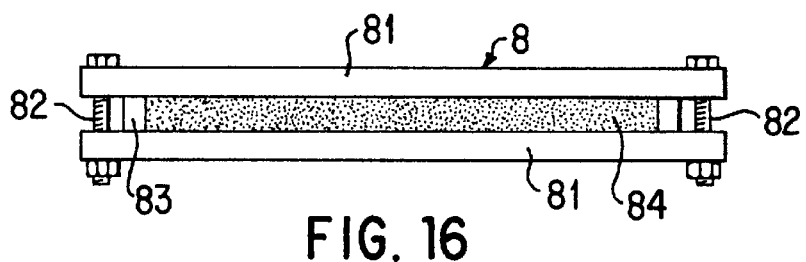
FIG. 16 is a section view for explaining a state where the resin foamed product is compressed to thereby obtain a shape-recoverable resin foamed product.

A resin foamed product (foaming magnification rate of 20 times, 500 mm in length, 500 mm in width, 10 mm in thickness, closed cell rate of 85%) obtained by injecting 4 parts by weight of carbonic acid gas, under a pressure, with respect to 100 parts by weight of a low density polyethylene (manufactured by Mitsubishi Yuka Co., Ltd., trade name "ZC30", melting point of 110° C.) and extruding to foam, was held between sintered metal pressing plates 81, 81 of a device 8 as shown in FIG. 16 immediately after foaming; tightened by bolts 82, 82 to be compressed to a thickness of spacers 83 in a thickness direction; and left in its state for 2 hours to thereby obtain a resin foamed product 84 having a thickness of 2 mm contracted in only the thickness direction.

Figure 17:
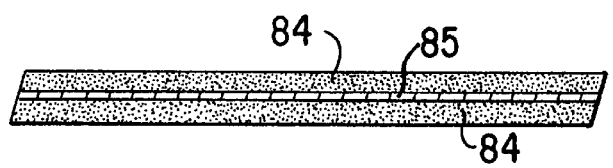
FIG. 17 is a section view for showing an example of the laminated structure of the present invention.

The obtained resin foamed product 84 was laminated with a ethylene-vinyl acetate copolymer sheet (manufactured by Mitsubishi Yuka Co., Ltd., trade name "EVA20F", 500 mm in length, 500 mm in width, 1 mm in thickness, melting point of 100° C.) 85; and only the ethylene-vinyl acetate copolymer sheet 85 was melted by hot air of 100° C. Then, another shape-recoverable foamed product 84 was laminated on the other side of the melted ethylene-vinyl acetate copolymer sheet 85 to obtain a laminated structure as shown in FIG. 17. The obtained laminated structure had a thickness of 4 mm. The laminated structure was left under normal temperature and pressure for 30 days, and its thickness was recovered up to 15 mm.

Comparison Example 14

A resin foamed product (foaming magnification rate of 20 times, 500 mm in length, 500 mm in width, closed cell rate of 85%) having a thickness of 20 mm was obtained by injecting 4 parts by weight of carbonic acid gas under a pressure with respect to 100 parts by weight of a low density polyethylene (manufactured by Mitsubishi Yuka Co., Ltd., trade name "ZC30", melting point of 110° C.), and extruding to foam.

Figure 18:
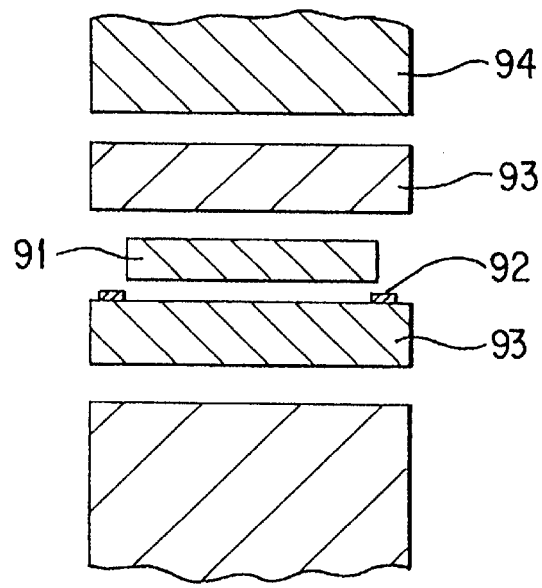
FIG. 18 is a section view for explaining the first half step of another method for producing the resin foamed product of the present invention.

The obtained resin foamed product was compressed to a thickness of 4 mm by a device as shown in FIG. 18, and it took 4 hours before a resin foamed product having an intended delayed shape recoverable property was obtained.

EXAMPLE 33

(Example 33 and Comparison Example 15 correspond to invention 15.)

100 parts by weight of a low density polyethylene (manufactured by Mitsubishi Yuka Co., Ltd., trade name "ZH51") and 1 part by weight of talc (manufactured by Nippon Talc Co., Ltd., trade name "MS") were charged into a monoaxial extruder (set at 130° C.) having a diameter of 65 mm and kneaded to obtain a resin composition; pentane (boiling point of 36° C.) was added under a pressure to the obtained resin composition at a rate of 8 parts by weight with respect to 100 parts by weight of the resin from a vent portion of the extruder and further kneaded to obtain a foamable resin material; and subsequently, the kneaded foamable resin material was extruded in a sheet shape at an extruding rate of 25 kg/hr from an extruding die set at a temperature of 150° C. and having a thickness of 1 mm and a width of 100 mm. The extruded sheet-shape foamable resin material was immediately foamed to thereby obtain a resin foamed product having a thickness of 3 mm, a foaming magnification rate of 24 times, and a closed cell rate of 88%.

Then, the resin foamed product was subsequently introduced into a tenter drawing machine set at a temperature of 70° C.; drawn by 2.0 times in a width direction to obtain a drawn resin foamed product; and then the obtained drawn resin foamed product was cooled to 25° C.

With the cooling, pentane existing in closed cells in a form of gas was liquefied and an interior of the closed cell became a reduced pressure state so that the drawn resin foamed product was contracted in a thickness direction to thereby become a resin foamed product having a foaming magnification rate of 7 times and 0.5 mm in thickness.

The obtained resin foamed product was cut into a piece having 100 mm in length, 200 in width and 0.5 mm in thickness; and the cut piece was heated at a temperature of 80° C. for 15 seconds to have 145 mm in length, 95 mm in width and 0.8 mm in thickness, so that the piece was greatly contracted in a longitudinal direction in which the resin was drawn. Then, the contracted resin foamed product was left under normal temperature and pressure for 15 days to thereby have 145 mm in length, 95 mm in width and 1.8 mm in thickness, so that the resin foamed product was recovered in a thickness direction. The foaming magnification rate at that time was 20 times.

Also, the obtained resin foamed product having a foaming magnification rate of 7 times and a thickness of 0.5 mm was cut into a piece; both ends in a drawing direction of the cut piece were bonded together to form a cylinder having a radius of 31 mm; the resin foamed cylinder was disposed to surround another cylinder having a radius of 28 mm; and then heat of 80° C. was applied to the resin foamed cylinder. The resin foamed cylinder was contracted to closely attach to the inner cylinder without any spaces therebetween. Moreover, the appearance was good.

After the resin foamed product closely attached to the inner cylinder was left under normal temperature and pressure for 20 days, the resin foamed product was recovered to 1.8 mm in thickness.

Comparison Example 15

With a producing method disclosed in Japanese Patent Publication (KOKOKU) SHO52-22021, a foamed polystyrene resin sheet drawn in a monoaxial direction and having a foaming magnification rate of 10 times and a thickness of 1 mm was prepared.

The foamed polystyrene resin sheet was formed into a cylinder having a radius of 31 mm in the same manner as in Example 33; the foamed polystyrene resin cylinder was disposed to surround another cylinder having a radius of 28 mm; and then heat of 130° C. was applied to the resin foamed product. The resin foamed product was contracted to closely attach to the smaller cylinder without spaces therebetween. Moreover, the appearance was good.

However, although the foamed polystyrene resin sheet was left under normal temperature and pressure, there was no change in thickness.

In other words, since the thickness does not change, there have been problems such that in case cargoes are transported or stored, they are bulky to thereby increase a transportation cost or storage cost.

EXAMPLE 34

(Example 34 and Comparison Example 16 correspond to invention 16.)

A resin composition comprising a mixture of 100 parts by weight of a low density polyethylene [manufactured by Sumitomo Chemical Co., Ltd., trade name "G201", Tm=107° C., gas permeability of $1.3 \times 10^{-10}$ cm$^3$ (STP)cm$^-$$_1$·S$^{-1}$·cmHg$^{-1}$], 15 parts by weight of azodicarbonamide and 0.6 part by weight of dicumyl peroxide (Nippon Yushi Co., Ltd., trade name "PAAKUMIRU D") was continuously extruded from a shaping mold having 5 mm in thickness and 200 mm in width at an extruding quantity of 10 kg/hr. Incidentally, temperatures of a cylinder of the extruder at that time were set at 105° C., 115° C. and 120° C. in this order from a hopper toward a forward end of the extruder.

Then, a sheet-shape formed product extruded from the shaping mold was heated to 170° C. at the first half portion of a hot air drying furnace provided immediately after the shaping mold to cross-link, and heated to 250° C. at the latter half portion of the hot air drying furnace to foam, thus obtaining a resin foamed product having 400 mm in length, 400 mm in width, 15 mm in thickness, a foaming magnification rate of 31 times, and an open cell rate of 7%.

The obtained resin foamed product was provided with holes by needles having a diameter of 300 μm to be an open cell rate of 95% in a thickness direction to thereby obtain an open cell resin foamed product.

Then, as shown in FIG. 18, the resin foamed product 91 was cut into a piece of 300 mm in length, 300 in width and 15 mm in thickness; the cut piece 91 was held between two porous plates 93, 93 with spacers 92 having a thickness of 3 mm; and was pressed for 40 seconds under a pressure of 100 kg/cm$^2$ while heating from lower and upper sides thereof by a pressing machine 94 at a temperature of 150° C. to obtain a resin foamed product having 300 mm in length, 300 mm in width and 3 mm in thickness.

Comparison Example 16

The resin foamed product provided with holes by the needles obtained in Example 34 was subjected to a 30% impregnation treatment of chloroparaffin, and was pressed to one thirds.

An open cell rate and a water absorption in an inner portion of the resin foamed product obtained in Example 34 were measured. The results are shown in Table 10.

Incidentally, the open cell rate was measured as follows. A surface of the resin foamed product was shaved in a thickness of 500 μm; then, a closed cell rate thereof was measured by a 1-1/2-1 air pressure method by an air comparison type densimeter 1000 manufactured by Tokyo Science Co., Ltd.; and the open cell rate was measured from an equation of "an open cell rate=100%–the closed cell rate". Also, the water absorption was measured such that the shaved pieces were dipped in water for 4 hours and then a weight change rate was measured.

TABLE 10

| | Inner open cell rate (%) | Water absorption (%) |
|---|---|---|
| Example 34 | 93 | <0.01 |

Also, with respect to the resin foamed products obtained in Example 34 and Comparison Example 16, an initial thickness, a thickness after 30 days, heat insulating property, sealing property and applicability were measured, and the results are shown in Table 11.

TABLE 11

|  | Initial thickness (mm) | Thickness after 30 days (mm) | Thermal conductivity (Kcal/m · ° C. · hr) | Sealing property | Applicability |
|---|---|---|---|---|---|
| Ex. 34 | 3 | 12 | 0.035 | ◯ | ◯ |
| Com. Ex. 16 | 5 | 14 | — | X | X |

EXAMPLE 35

(Example 35 and Comparison Example 17 correspond to invention 17.) (An open cell foamed product provided with holes by needles was used.)

A resin composition comprising a mixture of 100 parts by weight of a low density polyethylene (manufactured by Sumitomo Chemical Co., Ltd., trade name "SUMIKASEN G201"), 0.6 part by weight of dicumyl peroxide (one minute half-life temperature of 171° C.), and 15 parts by weight of azodicarbonamide (decomposition temperature of 198° C.) was supplied to a hopper of a screw extruder (diameter of 50 mm, L/D=30), and was melt-kneaded in the extruder. A temperature in a cylinder of the extruder was set at 105° C., 120° C. and 120° C. in this order from the hopper toward a forward end of the extruder.

Then, the molten and kneaded resin composition was continuously extruded at a rate of 10 kg/hr in a sheet shape through a die of a shaping mold having 5 mm in thickness and 200 mm in width, and set at a temperature of 120° C.

A hot air heating furnace was provided immediately after the shaping mold. The extrusion molded sheet was heated at the first half portion of the hot air heating furnace at a temperature of 170° C. to cross-link, and then heated at the latter half portion of the hot air heating furnace at a temperature of 250° C. to foam.

The obtained resin foamed product was a sheet of 16 mm in thickness and 610 mm in width, and had a foaming magnification rate of 29.5 times, a closed cell rate of 86% and a compression permanent set of 5.9%.

The sheet-shape resin foamed product was provided with holes by needles in a thickness direction to thereby communicate the closed cells with each other, so that the closed cell rate was reduced to 5% and under.

Then, the resin foamed product was passed through a space set at 8 mm between upper and lower rollers to compress, and a polyethylene film was heat-laminated around the compressed resin foamed sheet to obtain a laminated structure in a thickness of 8 mm.

The polyethylene film had a thickness of 40 μm, a volume V per 1 m in length of the resin foamed product was 100×61×1.6=9760 cm$^3$, a surface area S per 1 m in length of the resin foamed product was (61×100)×2+(100×1.6)×2+(61×1.6)×2=12,751.2 cm$^2$, and an air permeating quantity P of the film was 0.01 cm$^3$/cm$^2$·hr·atm. Thus, a relationship of "V per 1 m in length/(S×P)=76.8" can be obtained.

The thus obtained laminated structure was cut into a piece of 300 mm in length and 300 mm in width. The cut piece had a dimension of 300 mm in length, 300 mm in width and 16 mm in thickness (two sheets of the foamed product, each having 8 mm in thickness). A contraction rate of the laminated structure was 50%.

Incidentally, the laminated structure under normal temperature and pressure after 30 days had 300 mm in length, 300 mm in width, 30 mm in thickness and 94% in contraction rate.

Comparison Example 17

(Normal thermoplastic resin foamed heat insulating material)

A sheet-shape resin foamed product was obtained in the same manner as in Example 35 except that the resin foamed product was not provided with holes by needles. The foamed product was a sheet having 15 mm in thickness, 610 mm in width, a foaming magnification rate of 29.5 times, a closed cell rate of 86% and a compression permanent set of 5.9%.

The resin foamed product was cut in the same manner as in Example 35.

The obtained cut piece had 300 mm in length, 300 mm in width and 30 mm in thickness (two sheets of the foamed product, each having 15 mm in thickness), and with this dimension, was used for a test evaluation described later.

The cut piece was not covered with a film.

Incidentally, the foaming magnification rate and the dimension under normal temperature and pressure after 30 days of the resin foamed product did not change.

With respect to the laminated structure or the resin foamed product obtained in Example 35 and Comparison Example 17, respectively, performance evaluations with respect to heat insulating property, applicability and filling property, as a heat insulating material, were carried out. The results are shown in Table 12.

TABLE 12

|  | Shape | | | | | | |
|---|---|---|---|---|---|---|---|
|  | Shape of space (mm) L × W × T | When applied (mm) L × W × T | 30 days after application (mm) L × W × T | Expansion rate (times) | Thermal conductivity (kcal/m/° C./hr) | Filing Property | Applicability |
| Exa. 35 | 300 × 300 × 30 | 300 × 300 × 16 | 300 × 300 × 30 | 1.875 | 0.033 | ◯ | ◯ |
| Com. Exa. 17 | 300 × 300 × 30 | 300 × 300 × 30 | 300 × 300 × 30 | 1 | 0.032 | x: (6) | x: (7) |

L: Length
W: Width
T: Thickness

In Table 12,

○: With respect to the filling property, no space was created between a heat insulating material and an inner wall of a container; with respect to applicability, application was easy.

x: With respect to the filling property, spaces were created between the heat insulating material and the inner wall of the container; with respect to applicability, application was difficult.

(6): Since a dimension of the heat insulating material was little smaller than that of the container, spaces were created between the heat insulating material and the inner wall of the container.

(7): Since a thickness of the heat insulating material was little thicker, it was difficult to put a lid on.

A polyethylene foamed product having the thickness of 10 mm was obtained in the same manner as in Example 2 except that the thickness of a shaping die was changed to 2.7 mm. (Hereinafter, the thus obtained foamed product is referred to as foamed product A.)

Example a

The foamed product A was provided with pores at a density of 8 pores/cm$^2$ with a needle having a diameter of 500 μm to make the closed cell rate to 55%.

Then, the foamed product was compressed by a press to 0.5 mm for 20 minutes and taken out to thereby obtain an objective foamed product of 2 mm. Detailed physical properties are shown in TABLE A. (The same is applied to the following Examples and Comparative Examples.)

Example b

The foamed product A was subjected to a cross-linking process by irradiating electron beam so that a gel portion rate became 95%, then provided with pores in the same manner as in Example a, and compressed to thereby obtain an objective foamed product.

Example c

A foamed product was obtained by bonding two sheets of polyethylene foamed products, trade name LIGHTORON S, produced by Sekisui Kaseihin Kogyo Kabushiki Kaisha and having grade No. 510, a foaming magnification rate of 47 times, a closed cell rate of 88%, a compression permanent set or distortion of 5% and gel portion rate of 0%.

The thus obtained foamed product was irradiated with an electron beam to carry out a cross-linking process so that the gel portion rate became 34%. The thus cross-liked foamed product was treated to have pores at a density of 8 pores/cm$^2$ by a needle having a diameter of 500 μm so that a closed cell rate became 57%. Then, the foamed product was compressed for 20 minutes to the thickness of 0.5 mm and then taken out to thereby obtain an objective foamed product with the thickness of 2 mm.

Example d

A polystyrene foamed product having the thickness of 10 mm, a closed cell rate of 92%, foaming magnification rate of 70 times, a compression permanent set of 8.6% and Tg of 102° C. was provided with pores at a density of 8 pores/cm$^2$ by a needle having a diameter of 500 μm to thereby have a closed cell rate of 57%.

The thus obtained foamed product was irradiated with an electron beam to be subjected to a cross-linking process so that a gel portion rate became 53%. Then, the foamed product was compressed by a press for 40 minutes to the thickness of 1.0 mm and taken out to thereby obtain an objective foamed product of the thickness of 2 mm.

Example e

A polystyrene foamed product having the thickness of 10 mm, a closed cell rate of 92%, a foaming magnification rate of 70 times, a compression permanent set of 8.6% and Tg of 102° C. was formed to have pores at a density of 8 pores/cm$^2$ by a needle having a diameter of 500 μm to thereby have a closed cell rate of 57%.

The thus obtained foamed product was irradiated with an electron beam to be subjected to a cross-linking process so that the gel portion rate became 66%. Then, the foamed product was compressed by a press for 40 minutes to the thickness of 1.0 mm and taken out to thereby obtain an objective foamed product of the thickness of 2 mm.

Example f

A polystyrene foamed product having the thickness of 10 mm, a closed cell rate of 92%, a foaming magnification rate of 70 times, a compression permanent set of 8.6% and Tg of 102° C. was provided with pores at a density of 8 pores/cm$^2$ by a needle having a diameter of 500 μm to thereby have a closed cell rate of 57%.

The thus obtained foamed product was irradiated with an electron beam to be subjected to a cross-linking process so that the gel portion rate became 30%. Then, the foamed product was compressed by a press for 40 minutes to the thickness of 1.0 mm and taken out to thereby obtain an objective foamed product of the thickness of 2 mm.

Comparative Example a

A foamed product A was formed to have pores at a density of 8 pores/cm$^2$ with a needle having a diameter of 500 μm by changing the positions 5 times so that a closed cell rate became 20%.

Then, the foamed product was compressed by a press for 7 minutes to the thickness of 0.5 mm and taken out to thereby obtain an objective foamed product of the thickness of 2 mm.

Comparative Example b

A hard polyurethane foamed product having the thickness of 10 mm was formed to have pores in the same manner as in Example a to have a closed cell rate of 60%. A compression permanent distortion or set of the formed product was 23%.

The thus obtained foamed product was compressed by a press in the same manner as in Example a and taken out to thereby have the thickness of 0.7 mm.

TABLE A

| | Foaming magnification rate (%) | Closed cell rate (%) | Compression permanent set *1 (%) | Gel portion rate*2 (%) | Tg (° C.) | Initial thickness after compression and taking out (mm) | Thickness 1 hour later after leaving as it is (mm) | Thickness 30 days later after leaving as it was (mm) | Thickness after leaving as it was for 30 days & taking off parallel plates after storage for one month*3 | Modification following property*4 (visual observation) |
|---|---|---|---|---|---|---|---|---|---|---|
| Example a | 30 | 55 | 4 | 64 | −120 | 2 | 2.8 | 9.6 | 9.4 | no space |
| Example b | 31 | 54 | 3.1 | 95 | −120 | 2 | 3.0 | 9.7 | 9.6 | no space |
| Example c | 47 | 57 | 4.1 | 34 | −120 | 2 | 2.8 | 9.5 | 7.8 | no space |
| Example d | 70 | 57 | 8.4 | 53 | 102 | 2 | 2.5 | 8.5 | 8.2 | space |
| Example e | 70 | 57 | 8.2 | 66 | 103 | 2 | 2.6 | 8.5 | 8.4 | space |
| Example f | 70 | 57 | 8.6 | 25 | 102 | 2 | 2.5 | 8.4 | 6.3 | space |
| Comparison Example a | 30 | 20 | 3.8 | 64 | −120 | 2 | 7 | 9.6 | — | no space |
| Comparison Example b | 11 | 60 | 23 | 98 | 60 | 0.7 | 0.8 | 0.8 | — | space |

Remarks:
1: Compression permanent set or distortion

A foamed product was sandwiched between two parallel plates, and compressed to 25% of an initial thickness. In this state, the foamed product was left as it was for 22 hours under a standard condition, i.e. 23° C., 65% Rh. Thereafter, the foamed product was taken out therefrom, and left for 24 hours under the standard condition to measure a thickness thereof. A distortion rate with respect to the initial thickness was calculated by the following equation:

Compression permanent set (%)=(10−t1)/t0×100 wherein t1 represents an initial thickness of the foamed product; and t0 represents a thickness after the above-mentioned compression.

2: Gel portion rate

A foamed product was immersed in xylene for 24 hours, and a ratio of a weight of a non-molten portion with respect to the initial weight thereof was measured.

3: After the foamed product was produced, in order to keep its contracting state, the foamed product was sandwiched between two parallel plates having the same spaces as that of the foamed product in the contracting state, and left for one month at a normal temperature of 23° C. Then, the parallel plates were taken off, and a recovering movement of the foamed product was observed.

Figures 24A, 24B:
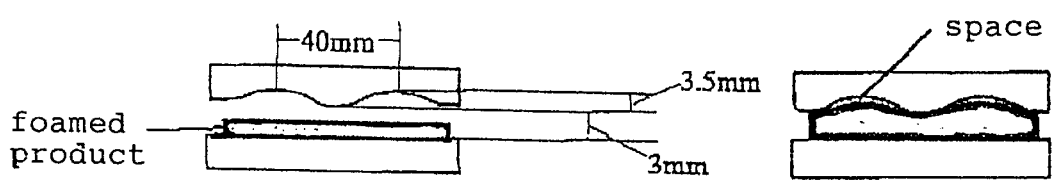
FIGS. 24(a) and 24(b) are explanatory side views of a test device for showing a modification following property of a foamed product.

4. A modification following property was obtained as follows:

The foamed product was set in a space as shown in FIG. 24(a), and left for 30 days to observe the space. A case where the space exists is shown in FIG. 24(b).

Since a resin foamed product obtained in invention 1 before application is contracted and can be easily inserted into an intended space, the applicability thereof is excellent. After application, since the contracted portion is gradually returned to a state before deformation, heat insulating property, sealing property and applicability are excellent. Therefore, the resin foamed product having a shape recoverable property according to the present invention can be suitably used as a heat insulating material, buffer material and sealing material.

According to methods for producing resin foamed products of inventions 2 to 4, after a resin foamed product having a closed cell structure is foamed, volumes of other portions except for a fixed portion of the resin foamed product are contracted to have distortions so that the contracted portions attempt to return to a stable condition at a time of foaming (elasticity recovery); and air enters cells thereof to gradually expand. Thus, the resin foamed product having the shape recoverable property of invention 1 can be obtained.

In methods for producing resin foamed products according to inventions 5 to 6, after a resin foamed product having a closed cell structure is foamed, the resin foamed product is contracted to have distortions so that the contracted resin foamed product attempt to return to a stable condition at a time of foaming (elasticity recovery); and air enters cells thereof to gradually expand. Thus, a resin foamed product having the above described property can be obtained.

In a method for producing a resin foamed product of invention 7, a shape-recoverable resin foamed product having a specific shape can be manufactured without a manufacturing cost; and of course, since the obtained resin foamed product has a delayed shape recoverable property, when used as a buffer material, heat insulating material and sealing material, the resin foamed product has good applicability and is very useful as a construction material.

A resin foamed product of invention 8 is not bulky so that its transportation and applicability are excellent. Moreover, a shape recovering time of the resin foamed product can be controlled as desired.

In a method for producing a resin foamed product of invention 9, the shape-recoverable resin foamed product of present invention 8 can be produced with a good productivity.

A laminated structure of invention 10 is a sheet shape at a time of application and moreover does not have any creases nor folds. Further, since a resin foamed product layer is contracted and easily applied to any narrow space, the laminated structure is excellent in applicability. After application, since the resin foamed product layer absorbs air into cells to expand, it can be closely filled in the space. Therefore, the laminated structure of the present invention is excellent in airtightening property, heat insulating property and sealing property, so that it can be advantageously used in a wide field, such as a heat insulating material for pipes, heat insulating material for buildings, buffer material for packages, interior furnishing buffer material for cars, sealing material for buildings and wood grain material.

In a laminated structure of invention 11, particularly, since a quantity of air entering cells through partition walls at the time of shape recovery can be adjusted by a polymeric material membrane, time for recovering a shape can be controlled, and the polymeric material membrane can be closely attached along a wall surface of a place where the laminated structure is provided through the shape recovery.

In a laminated structure of invention 12, particularly, since a quantity of air entering cells through partition walls at the time of shape recovery can be adjusted by an inorganic substance layer having gas permeating holes, time for recovering the shape can be controlled, and the laminated structure can be closely attached along a wall surface of a place where the laminated structure is disposed by the inorganic substance layer having the gas permeating holes.

In a laminated structure of invention 13, particularly, since a quantity of air entering cells through partition walls at the time of shape recovery can be adjusted by an adhesive agent layer having gas permeating holes, time for recovering a shape can be controlled, and the laminated structure can be closely attached along a wall surface of a place where the laminated structure is disposed by the adhesive agent layer having the gas permeating holes.

In a laminated structure of invention 14, particularly, without using a specific mold or molding device, a resin foamed product having a shape recoverable property can be formed into a laminated structure with an adjacent layer, and at the time of lamination, is melted only in surfaces thereof, so that the shape recovering ability thereof can not be damaged.

A resin foamed product having a shape recoverable property of invention 15, particularly, like a heat contractile film, can be used as not only a wrapping material and a covering material but also a buffer material and a heat insulating material. Moreover, since a bulk of the resin foamed product can be reduced when it is not used, a transportation cost and a storage cost can be reduced.

In a resin foamed product of invention 16, even in case a resin foamed product having an open cell structure is used as a base material, since the open cell structure portion is contracted at a time of application, the resin foamed product can be easily applied to a narrow space, thus having an excellent applicability. After application, since air enters cells of the resin foamed product to expand, the resin foamed product is closely filled in the space. Therefore, the resin foamed product of the invention is excellent in sealing property, heat insulating property and sealing property, so that the resin foamed product can be advantageously used in a wide field, such as a heat insulating material for pipes, heat insulating material for buildings, buffer material for packages, interior furnishing buffer material for cars, sealing material for buildings and wood grain material. Also, since the open cell structure portion is closed in surface portions, a sealing property, heat insulating property and soundproofing property are not damaged.

In a laminate structure of invention 17, even in case a resin foamed product having an open cell structure and a fiber assembling structure are used as a base material, since the open cell structure portion of the resin foamed product and the resin assembling structure portion are contracted at a time of application, they can be easily applied to a narrow space to thereby have an excellent applicability. After application, air enters cells of the resin foamed product to expand, so that they are closely filled in the space. Therefore, the resin foamed product and the fiber assembling structure of the invention are excellent in air tightening property, heat insulating property and sealing property, so that they can be advantageously used in a wide field, such as a heat insulating material for pipes, heat insulating material for buildings, buffer material for packages, interior furnishing buffer material for cars, sealing material for buildings and wood grain material. Also, since the resin foamed product having the open cell structure and the fiber assembling structure are closed by films, a sealing property, heat insulating property and soundproofing property are not damaged.

Figure 19:
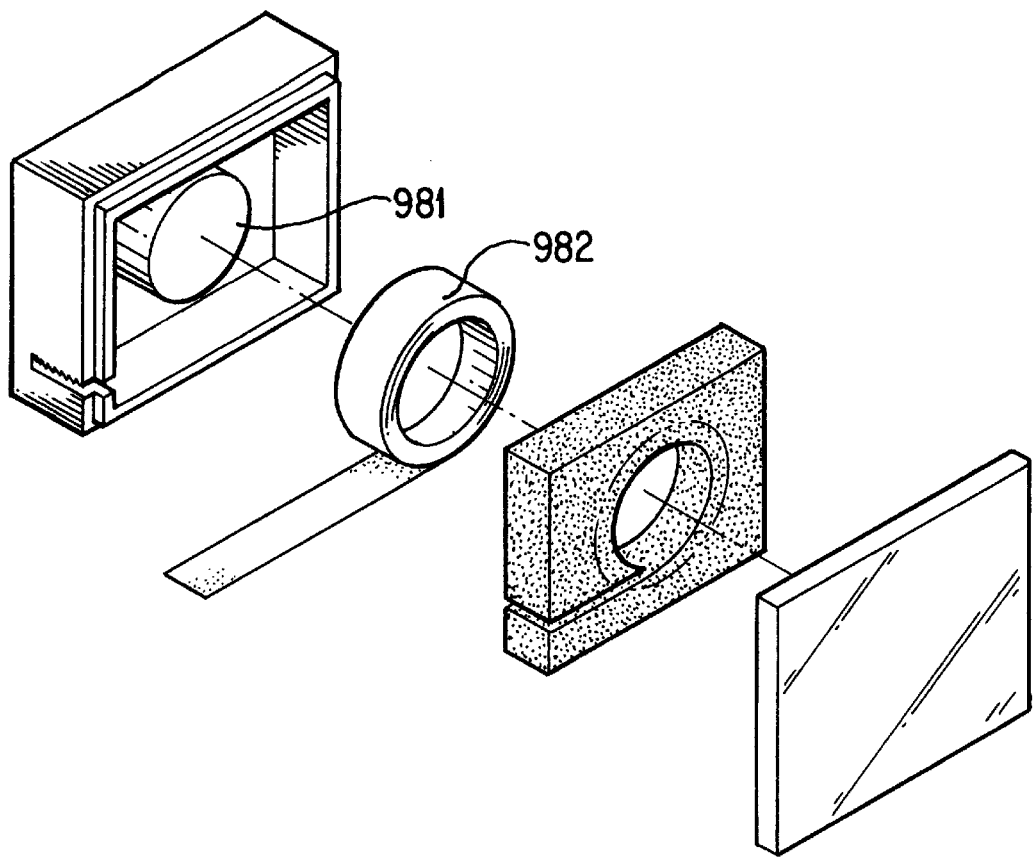
FIG. 19 is a perspective view for explaining an example for storing the resin foamed product or the laminated structure of the present invention.

Also, as shown in FIG. 19, in case a resin foamed product or a laminated structure 981 of the present invention is taped therearound with a tape-shape substance 982, the resin foamed product or the laminated structure 981 of the invention can be kept in a shape-recoverable state, and when necessary, a required quantity can be cut to be used.

Figures 20A, 20B:
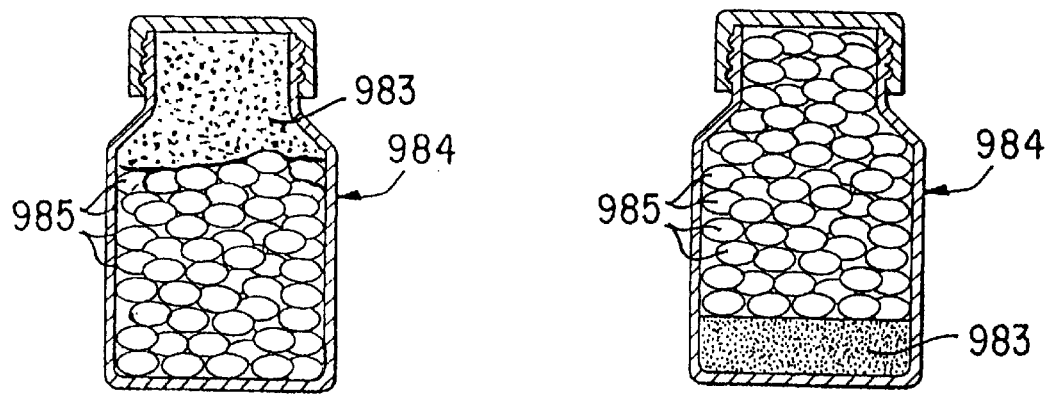

Also, as shown in FIG. 20(a), since the resin foamed product or the laminated structure 983 of the present invention can be easily inserted into a container 984 of medicine 985, they are used as a buffer material.

Further, as shown in FIG. 20(b), in case a resin foamed product or a laminated structure 983 of the present invention is provided on a bottom portion in a medicine container 984 as a buffer material, as a quantity of medicine 985 is reduced, since a shape of the resin foamed product or the laminated structure is recovered, the medicine can be pushed up toward an opening of the container, so that the medicine can be easily taken out.

Figure 21A:
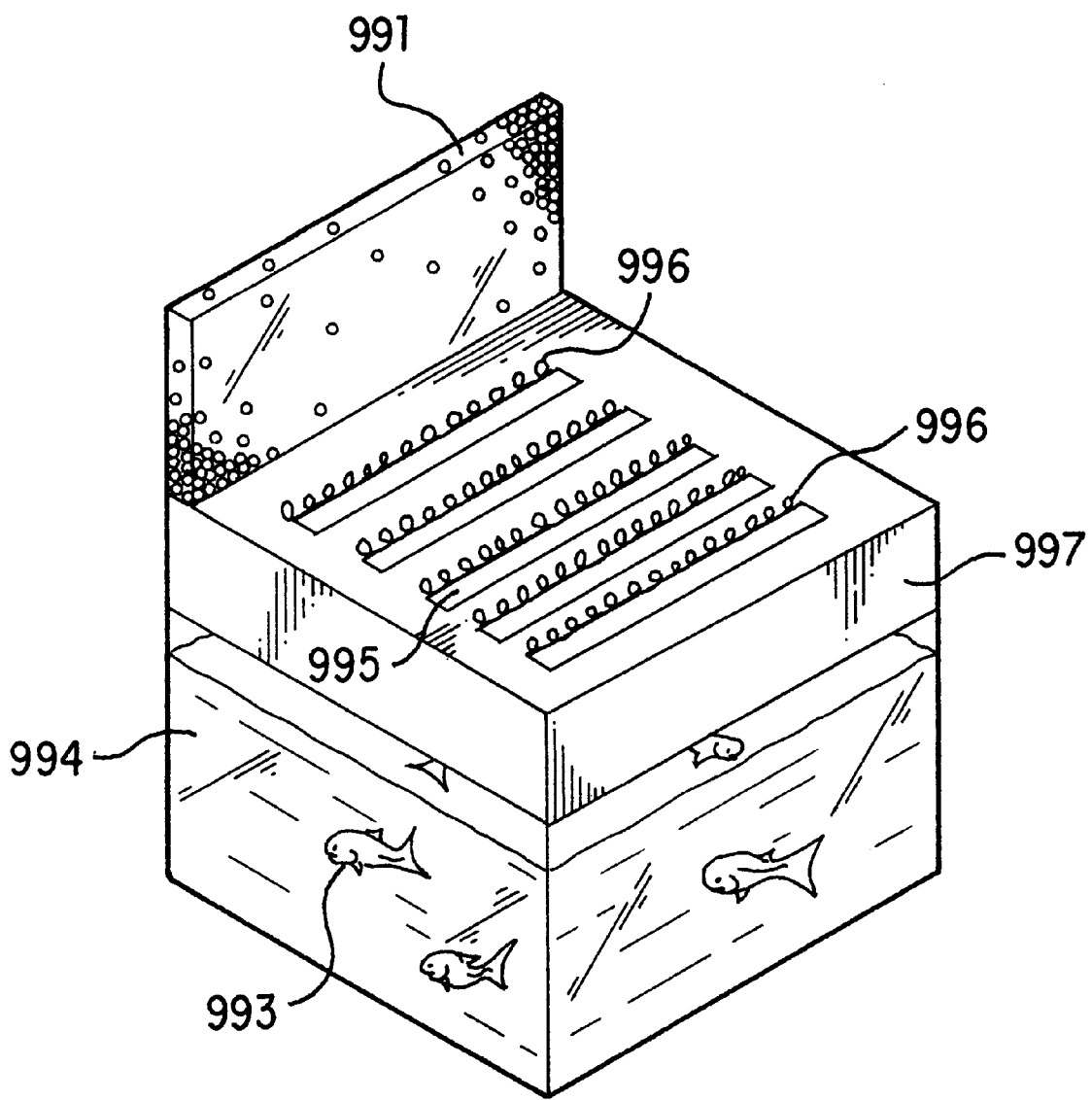
FIG. 21(a) is a perspective view for explaining another example of use of the resin foamed product or the laminated structure of the present invention.
Figure 21B:
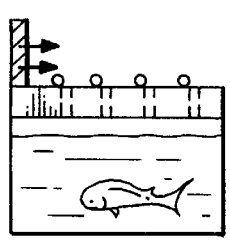
FIG. 21(b) is a diagram for showing a state before expansion of the resin foamed product or the laminated structure of the present invention.
Figure 21C:
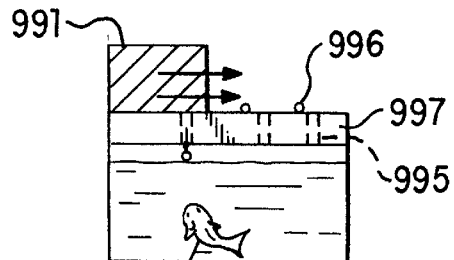
FIG. 21(c) is a diagram for showing changes by an elapsed time of the resin foamed product or laminated structure of the invention.

Also, as shown in FIGS. 21(a), 21(b), 21(c), a resin foamed product or a laminated structure 991 of the invention can be used as a moving member. More specifically, a cover member 997 provided with a plurality of holes 995 is installed on an upper opening portion of a water tank 994 for feeding fishes 993, such as a goldfish and tropical fish, and the resin foamed product or laminated structure 991 in a contracted state of the invention is provided to one end of an upper surface of the cover member 997, so that by a pressure caused when a shape of the resin foamed product or the laminated structure 991 is recovered, the foods 996 placed on the upper surface of the cover member 997 are gradually fallen into the water tank through the holes 995.

What is claimed is:

1. A resin foamed product comprising:
 a resin foamed material having open cells therein, a compression permanent set lower than 10% and an outer surface, and
 a film covering the outer surface of the resin foamed material as a skin layer for the resin foamed material, said skin layer having air permeability so that when the resin foamed material is compressed in an elastic deformation range, the resin foamed material recovers a shape thereof at an ambient temperature without providing heat as an outer stimulation to said resin foamed material, while absorbing air through the skin layer.

2. A resin foamed product comprising a resin, and closed cells dispersed in the resin, said resin with the closed cells therein having a closed cell rate higher than 30%, a compression permanent set lower than 10%, a cross linking degree higher than 40% in terms of a gel portion ratio, a Tg lower than 0° C., and a shape-recoverable property at an ambient temperature so that when contraction takes place in the resin with the closed cells, without heating said resin as an outer stimulation, a shape of the resin foamed product formed of the resin with the closed cells is automatically recovered in order at least in one direction without equally expanding in all directions.

3. A resin foamed product according to claim 2, wherein flexural modulus of the resin foamed product is less than 30,000 kgf/cm$^2$.

4. A resin foamed product according to claim 2, wherein said resin foamed product has a partially compressed portion to contract the closed cells, said partially compressed portion recovering a shape before it is contracted.

5. A resin foamed product according to claim 2, further comprising an air permeating path extending inwardly from an outer surface of the resin foamed product to a portion near at least one of the closed cells so that when the contraction occurs at at least one of the closed cells, the at least one of the closed cells easily recovers a shape.

6. A resin foamed product according to claim 2, wherein said resin having closed cells therein has a sheet form, said closed cells being inflatable to recover the shape of the resin foamed product, said resin foamed product having a layer integrally laminated at least partly on one side thereof.

7. A resin foamed product according to claim 6, wherein said layer is a resin sheet material having bending rigidity more than 1 g·cm formed on one side of the resin foamed material.

8. A resin foamed product according to claim 6, wherein said layer is made of a polymeric material having hardness of 30–110 at 20° C. by a spring type hardness tester A.

9. A resin foamed product according to claim 6, wherein said layer is made of an inorganic material with vent holes.

10. A resin foamed product according to claim 6, wherein said layer is made of an adhesive material with vent holes.

11. A resin foamed product according to claim 6, wherein said resin is melted on a surface thereof and adhered to the layer.

* * * * *